United States Patent
Murayama

(10) Patent No.: US 8,860,367 B2
(45) Date of Patent: Oct. 14, 2014

(54) WIRELESS CHARGING APPARATUS AND WIRELESS CHARGING SYSTEM

(75) Inventor: Yuji Murayama, Tokyo (JP)

(73) Assignee: Sony Corporation, Tokyo (JP)

(*) Notice: Subject to any disclaimer, the term of this patent is extended or adjusted under 35 U.S.C. 154(b) by 798 days.

(21) Appl. No.: 13/011,006

(22) Filed: Jan. 21, 2011

(65) Prior Publication Data

US 2011/0187320 A1 Aug. 4, 2011

(30) Foreign Application Priority Data

Jan. 29, 2010 (JP) ................................. 2010-017994

(51) Int. Cl.
*H02J 7/00* (2006.01)
(52) U.S. Cl.
CPC .. *H02J 7/00* (2013.01); *Y02B 60/50* (2013.01); *Y02T 90/16* (2013.01)
USPC .......................................................... 320/109
(58) Field of Classification Search
USPC ........................................ 320/108, 109, 115
See application file for complete search history.

(56) References Cited

U.S. PATENT DOCUMENTS

| | | | | |
|---|---|---|---|---|
| 4,800,328 A | * | 1/1989 | Bolger et al. | 320/106 |
| 5,654,621 A | * | 8/1997 | Seelig | 320/108 |
| 5,821,731 A | * | 10/1998 | Kuki et al. | 320/108 |
| 5,850,135 A | * | 12/1998 | Kuki et al. | 320/108 |

FOREIGN PATENT DOCUMENTS

| | | |
|---|---|---|
| JP | 2000-092615 | 3/2000 |
| JP | 2000-152512 | 5/2000 |
| JP | 2005-152512 | 6/2005 |
| JP | 2005-255144 | 9/2005 |

* cited by examiner

*Primary Examiner* — Samuel Berhanu
(74) *Attorney, Agent, or Firm* — Dentons US LLP

(57) ABSTRACT

Disclosed herein is a wireless electrical charging apparatus, including: a power-supply unit configured to generate power to be transferred to a power receiving apparatus; a power transferring device configured to transfer power generated by the power-supply unit to the power receiving apparatus; a power relaying device capable of relaying power transferred by the power transferring device to the power receiving apparatus; and a power-relaying-device moving mechanism section configured to move the power relaying device.

8 Claims, 21 Drawing Sheets

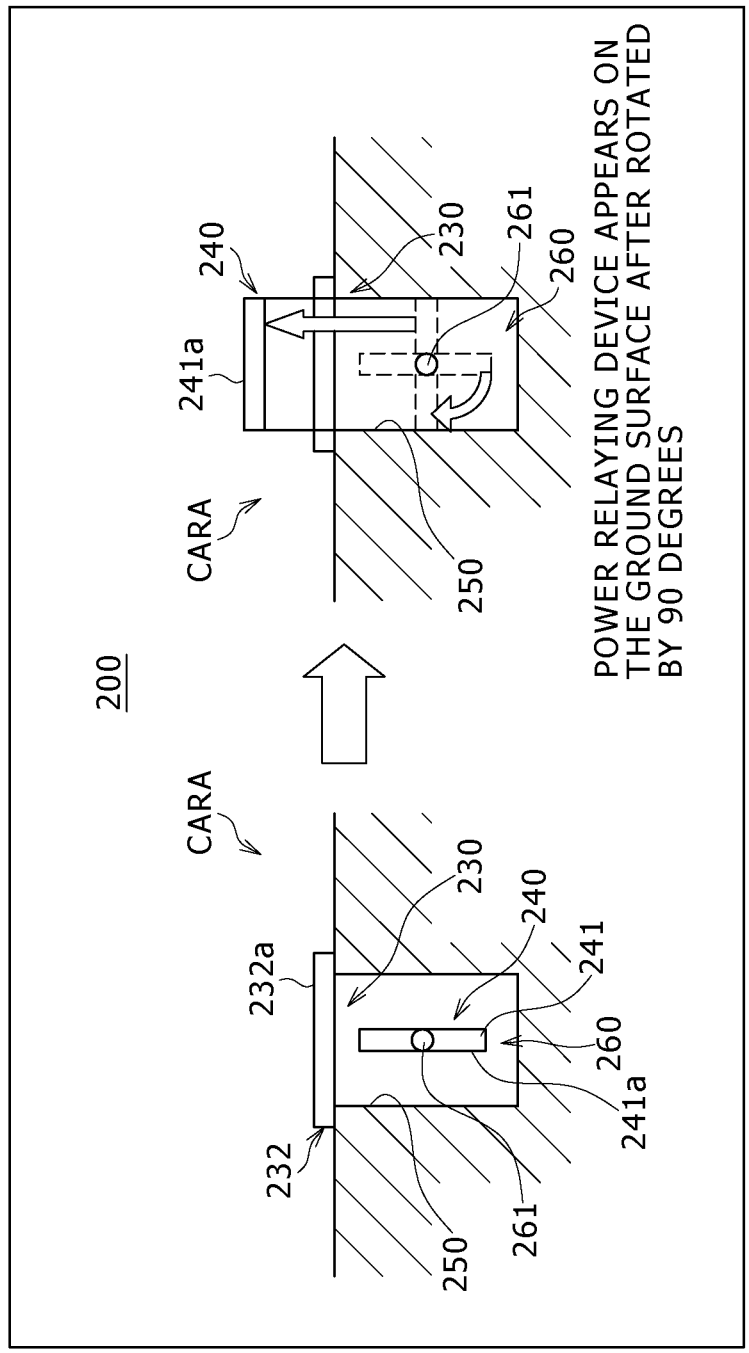

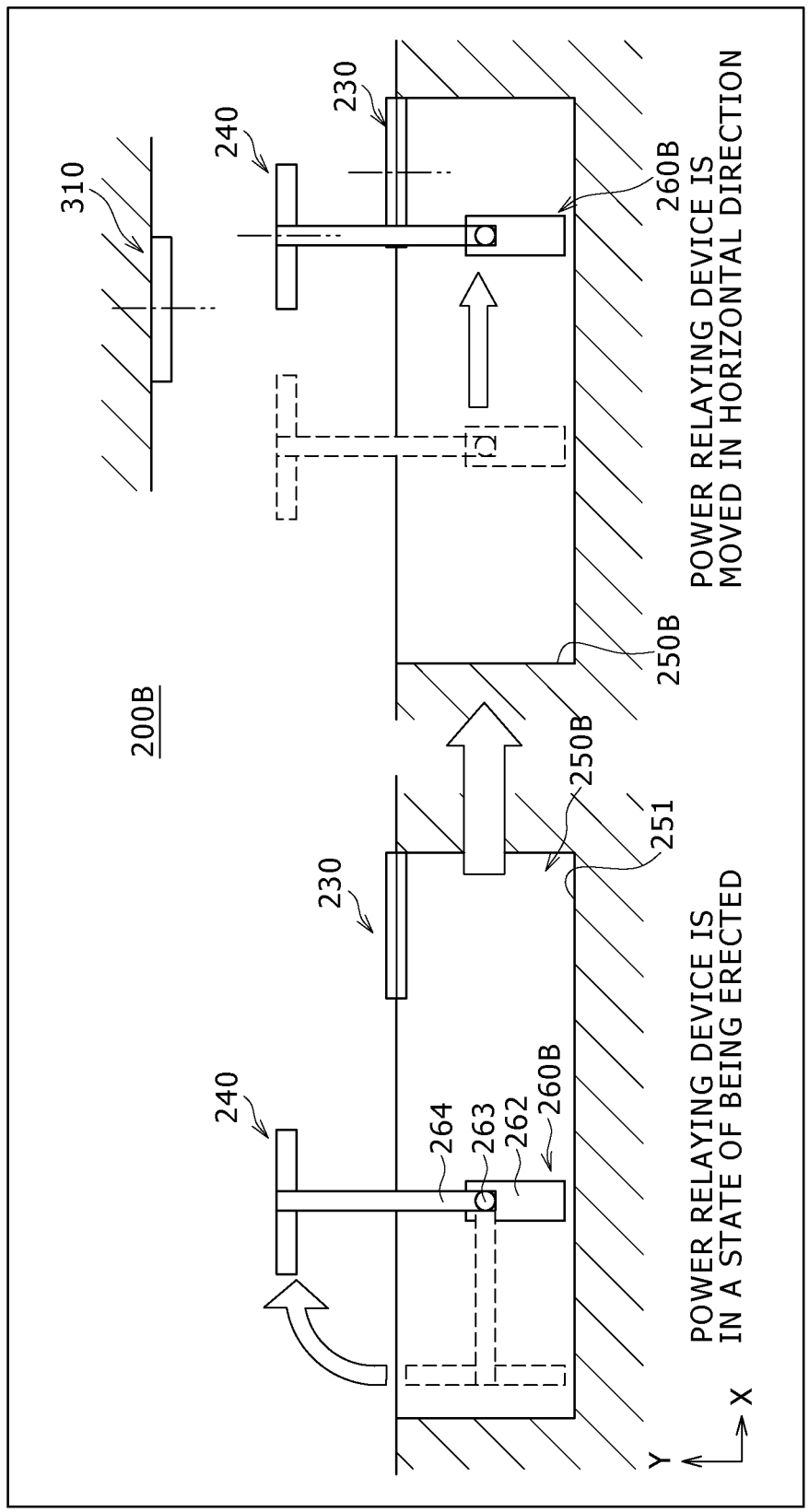

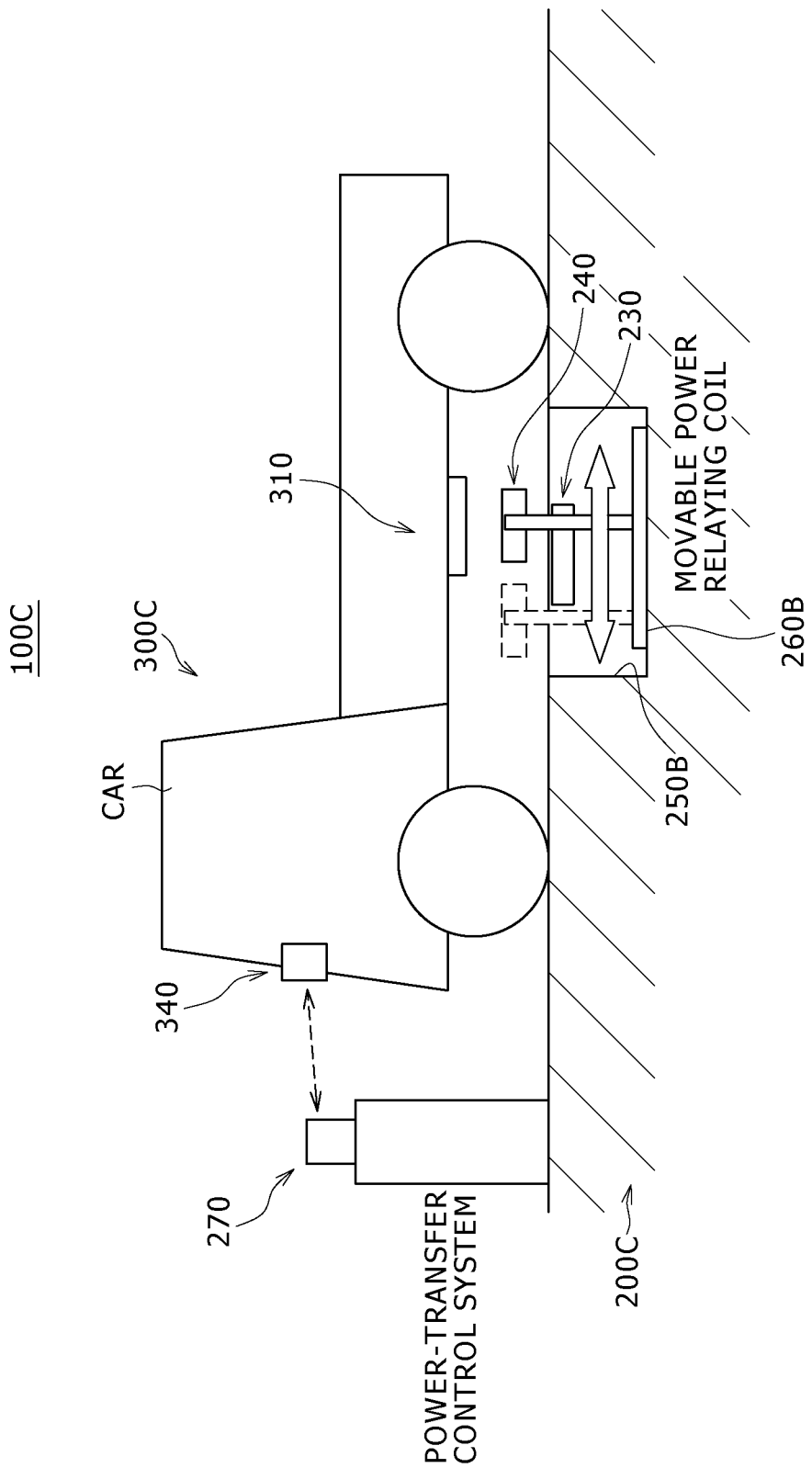

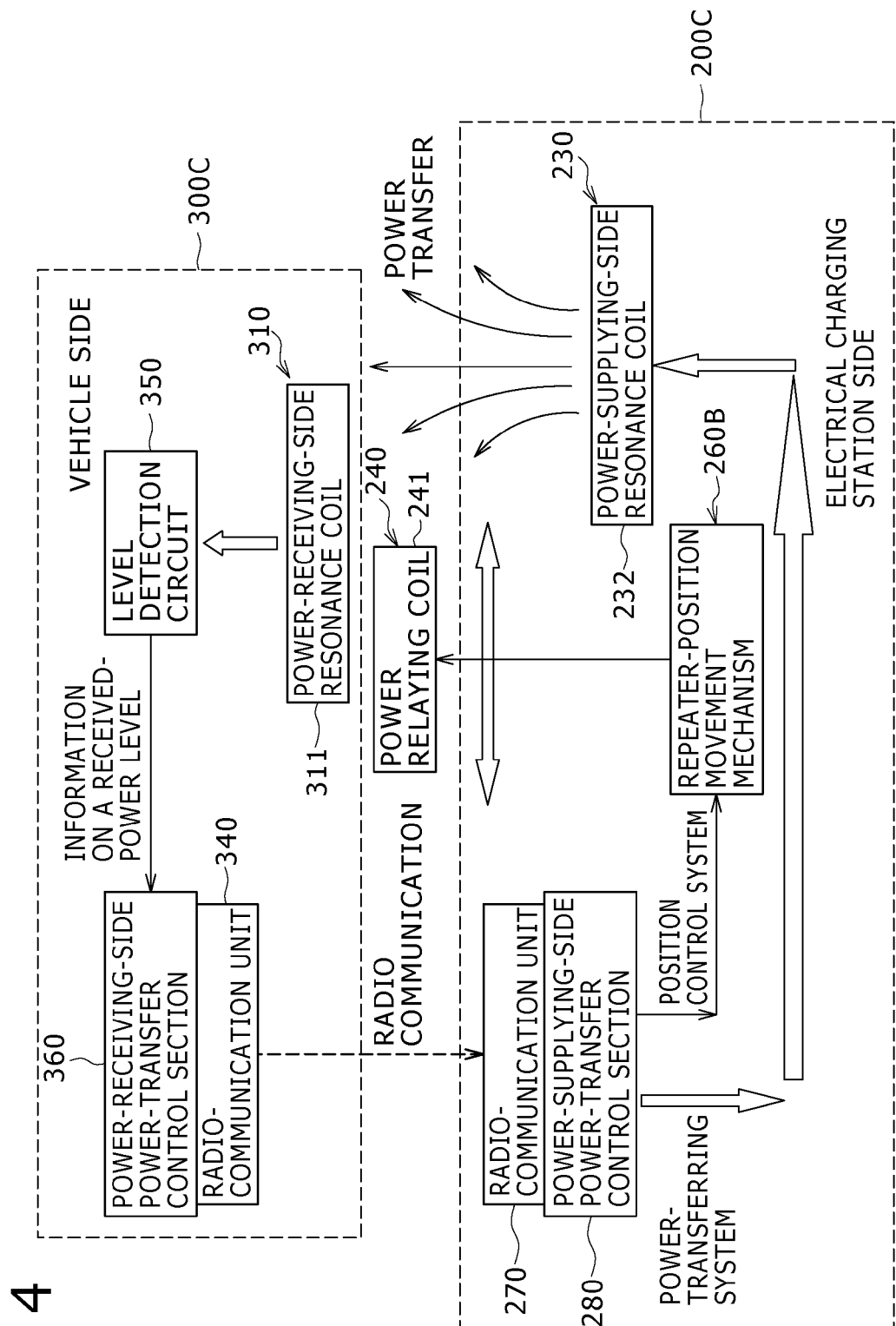

WIRELESS CHARGING APPARATUS AND WIRELESS CHARGING SYSTEM

BACKGROUND OF THE INVENTION

1. Field of the Invention

The present invention relates to a wireless electrical charging apparatus adopting a noncontact power supplying method allowing power to be transferred to a battery employed in an electric car or the like as power to be supplied to the battery, and relates to a wireless electrical charging system.

2. Description of the Related Art

Typically, a battery employed in an electric car is electrically charged by adoption of a general method by which a cable of an electrical charging stand is plugged into the battery in order to electrically charge the battery.

However, the amount of transferred power is large, requiring a thick and heavy cable to be plugged into the battery and connected to the battery. In addition, if the operation to electrically charge the battery is carried out outdoors, rainwater or the like makes the operation dangerous in some cases.

In order to solve the problem described above, the other method has been proposed. In accordance with the other method, two coils are exposed to each other so as to allow power to be transferred from one of the coils to the other in a noncontact way also referred to as a wireless way. In this way, it is possible to carry out a noncontact electrical charging operation for electrically charging the battery without electrical contact between metallic members of a wireless electrical charging system. The proposed method has been adopted for the purpose of testing the method.

This wireless transfer of power is briefly explained as follows.

In recent years, a wireless electric-charge supplying operation requiring no cable and a wireless electric-charge supplying system for carrying out such a wireless supplying operation have been attracting attention. The wireless electric-charge supplying operation is carried out by adoption of a cableless method referred to as a magnetic-field resonance method making use of an electromagnetic resonance phenomenon.

At the present day, in the contemporary non-contact power transferring system adopting the already widely used magnetic induction method, it is necessary to share magnetic fluxes between a power supplier on the power supplying side and a power receiver on the power receiving side so that, in order to transfer power from the power supplier to the power receiver with a high degree of efficiency, it is necessary to position the power receiver at a location very close to the power supplier. In addition, when the power receiver is coupled to the power supplier, it is important to align the axis of the power receiver to the axis of the power supplier.

On the other hand, the non-contact power transferring system making use of the electromagnetic resonance phenomenon offers a merit that the principle of the electromagnetic resonance phenomenon allows power to be transferred over a distance longer than the distance between the power supplier and the power receiver in the non-contact power transferring system adopting the magnetic induction method. In addition, the non-contact power transferring system making use of the electromagnetic resonance phenomenon also offers another merit that the efficiency of the power transfer does not decrease much even if the axis of the power receiver is not aligned to the axis of the power supplier to a certain degree.

It is to be noted that, in addition to the magnetic-field resonance method, an electric-field resonance method also makes use of the electromagnetic resonance phenomenon.

In addition, in recent years, there has been reported a wireless power transferring technology for transferring a power of 60 W over a distance of 2 m by adoption of a magnetic-field resonance method which makes use of a magnetic-field resonance phenomenon.

On top of that, there has also been reported development of an efficient wireless power transferring system for driving electronic apparatus separated from each other by a distance of 50 cm in order to transfer a power of 60 W by adoption of a magnetic-field resonance method.

As described above, the wireless power supplying (or transferring) system of the magnetic-field resonance type is the same as the wireless power supplying (or transferring) system of the electromagnetic induction type in that, in both the systems, power is transferred by making use of a magnetic field. In the case of the wireless power supplying (or transferring) system of the magnetic-field resonance type, however, the electromagnetic resonance phenomenon is used in order to obtain a power-transfer distance about 10 times the power-transfer distance of the wireless power supplying (or transferring) system of the electromagnetic induction type.

FIG. 1 is a diagram showing a typical configuration of a wireless electrical charging system for electrically charging generally the battery of an electric car by adoption of a wireless power transferring technique.

As shown in the figure, the wireless electrical charging system 1 is configured to include a wireless electrical charging stand 2 and the electric car 3.

The wireless electrical charging stand 2 has a power-supply unit 21 and a power transferring coil 22.

On the other hand, the electric car 3 includes a power receiving coil 31, an AC (Alternating Current)-DC (Direct Current) conversion circuit 32 and a battery 33.

In the wireless electrical charging system 1, in general, the power transferring coil 22 also referred to as a power supplying coil is installed on the surface of the ground whereas the power receiving coil 31 is incorporated on the bottom of a vehicle which is the electric car 3 shown in the diagram.

In the case of a big-size vehicle such as a truck or a bus, however, as shown in a diagram serving as FIG. 2, the bottom of the vehicle is far from the surface of the ground. Thus, the distance between the power transferring coil 22 and the power receiving coil 31 is undesirably long. As a result, the efficiency of the power transfer between the power transferring coil 22 and the power receiving coil 31 unavoidably becomes extremely poor.

There have been proposed a variety of technologies for solving the problems described above, for example, referring to Japanese Patent Laid-open Nos. 2005-255144 (as Patent Document 1), 2005-269687 (as Patent document 2), 2000-152512 (as Patent Document 3), and 2000-092615 (as Patent Document 4).

Patent Documents 1 to 4 disclose methods each adopted for moving the power transferring coil 22 to approach the power receiving coil 31 by mechanically raising the power transferring coil 22 from the surface of the ground in order to take the power transferring coil 22 to a position closer to the power receiving coil 31.

SUMMARY OF THE INVENTION

As shown in the diagram serving as FIG. 2, however, the power transferring coil 22 is connected to the power-supply unit 21 by making use of a thick and heavy cable for supplying large power from the power-supply unit 21 to the power transferring coil 22. Thus, the methods disclosed in the Patent Documents described above have a demerit that it is necessary to provide a large mechanism for mechanically moving the power transferring coil 22. In addition, the methods also have a demerit that it is quite within the bounds of possibility that the cable gets deteriorated more and more due to repeated operation for moving the power transferring coil 22.

Addressing the problems described above, inventor of the present invention has proposed a wireless electrical charging apparatus and a wireless electrical charging system which are capable of transferring power by adoption of a wireless technique without making use of a cable for transferring the power and capable of transferring the power with a high degree of efficiency by making use of a simple configuration which prevents the power transferring mechanism from becoming complicated even if the distance between the power transferring coil and the power receiving coil is long.

A wireless electrical charging apparatus according to a first embodiment of the present invention includes: a power-supply unit configured to generate power to be transferred to a power receiving apparatus; a power transferring device configured to transfer power generated by the power-supply unit to the power receiving apparatus; a power relaying device capable of relaying power transferred by the power transferring device to the power receiving apparatus; and a power-relaying-device moving mechanism section configured to move the power relaying device. In the wireless electrical charging apparatus, the power transferring device includes a first resonance element configured to transfer power received from the power-supply unit to the power receiving apparatus; the power relaying device includes a second resonance element configured to receive power supplied by the first resonance element through a magnetic-field resonance relation and transfer the power to the power receiving apparatus through a magnetic-field resonance relation; and the power-relaying-device moving mechanism section is capable of moving the power relaying device between an area of a state of not relaying power transferred by the power transferring device to the power receiving apparatus and a predetermined power-transfer allowing area of a state of relaying power transferred by the power transferring device to the power receiving apparatus.

A wireless electrical charging system according to a second embodiment of the present invention includes: a wireless electrical charging apparatus including a power-supply unit configured to generate power to be used for electrically charging a battery included in a power receiving apparatus and a power transferring device configured to transfer power generated by the power-supply unit to the power receiving apparatus; a power relaying device configured to relay power received from the power transferring device employed in the wireless electrical charging apparatus to the power receiving apparatus; and the power receiving apparatus including a power receiving device configured to receive power transferred by the power transferring device of the wireless electrical charging apparatus through a magnetic-field resonance relation or power relayed by the power relaying device through a magnetic-field resonance relation and electrically charge the received power into the battery. In the wireless electrical charging system, the power transferring device includes a first resonance element configured to receive power supplied by the power-supply unit and transfer the power to the power receiving device; the power relaying device includes a second resonance element configured to receive power supplied by the first resonance element through a magnetic-field resonance relation and relay the received power to the power receiving device through another magnetic-field resonance relation; and the power receiving device includes a third resonance element configured to receive power transferred by the power transferring device to the power receiving device through the magnetic-field resonance relation or power relayed by the power relaying device to the power receiving device through the other magnetic-field resonance relation.

By virtue of the present invention, it is possible to transfer power by adoption of a wireless technique without making use of a cable for transferring the power with a high degree of efficiency by making use of a simple configuration which prevents the power transferring mechanism from becoming complicated even if the distance between the power transferring coil serving as the first resonance element and the power receiving coil serving as the third resonance element is long.

BRIEF DESCRIPTION OF THE DRAWINGS

FIGS. 10A and 10B are diagrams showing a first typical configuration of a first power-relaying-device moving (including and excluding) mechanism section employed in a wireless electrical charging apparatus in accordance with an embodiment;

FIGS. 12A and 12B are diagrams showing a typical configuration of a third power-relaying-device moving (including and excluding) mechanism section employed in a wireless electrical charging apparatus in accordance with the embodiment;

FIG. 13 is a diagram showing a model of a first typical wireless electrical charging system carrying out control to move the power relaying device to an optimum power relaying position in accordance with the embodiment;

FIG. 14 is a block diagram showing a signal processing system employed in the first typical wireless electrical charging system carrying out control to move the power relaying device to an optimum power relaying position in accordance with the embodiment;

DETAILED DESCRIPTION OF THE PREFERRED EMBODIMENTS

Embodiments of the present invention are explained below by referring to diagrams.

It is to be noted that the embodiments are explained in chapters arranged in the following order.

Figure 1:
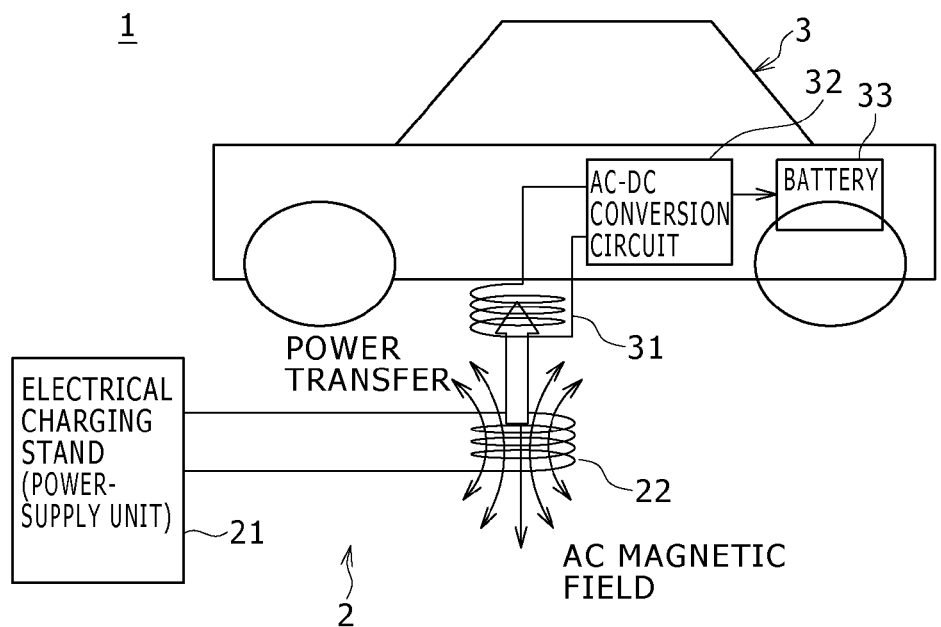
FIG. 1 is a diagram showing a typical configuration of a wireless electrical charging system for electrically charging generally the battery of an electric car by adoption of a wireless power transferring technique.
Figure 2:
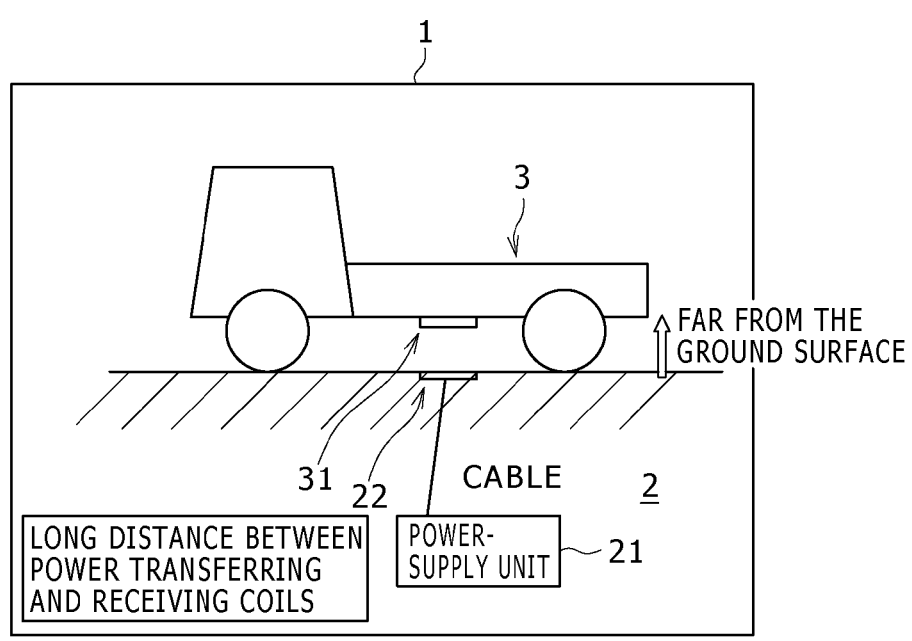
FIG. 2 is an explanatory diagram to be referred to in description of a power transfer for a big-size vehicle in which the distance between a power transferring coil and a power receiving coil is undesirably long so that the efficiency of the power transfer between the power transferring coil and the power receiving coil unavoidably becomes poor.
Figure 3:
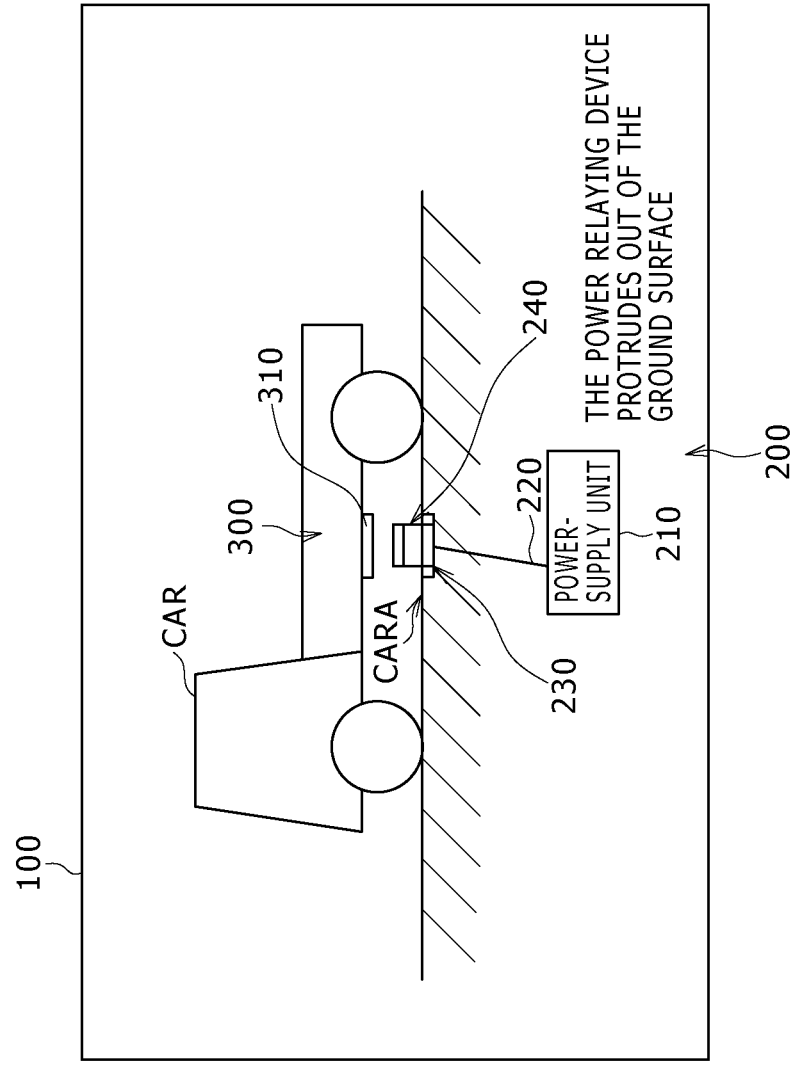
FIG. 3 is a diagram showing a first typical configuration of a wireless electrical charging system according to a first embodiment of the present invention.

1. First Embodiment Implementing First Typical Configuration of Wireless Electrical Charging System
2. Second Embodiment Implementing Second Typical Configuration of Wireless Electrical Charging System
3. Third Embodiment Implementing Third Typical Configuration of Wireless Electrical Charging System
4. Fourth Embodiment Implementing Fourth Typical Configuration of Wireless Electrical Charging System 1. First Embodiment FIG. 3 is a diagram showing a first typical configuration of a wireless electrical charging system 100 according to a first embodiment of the present invention.

Figure 4:
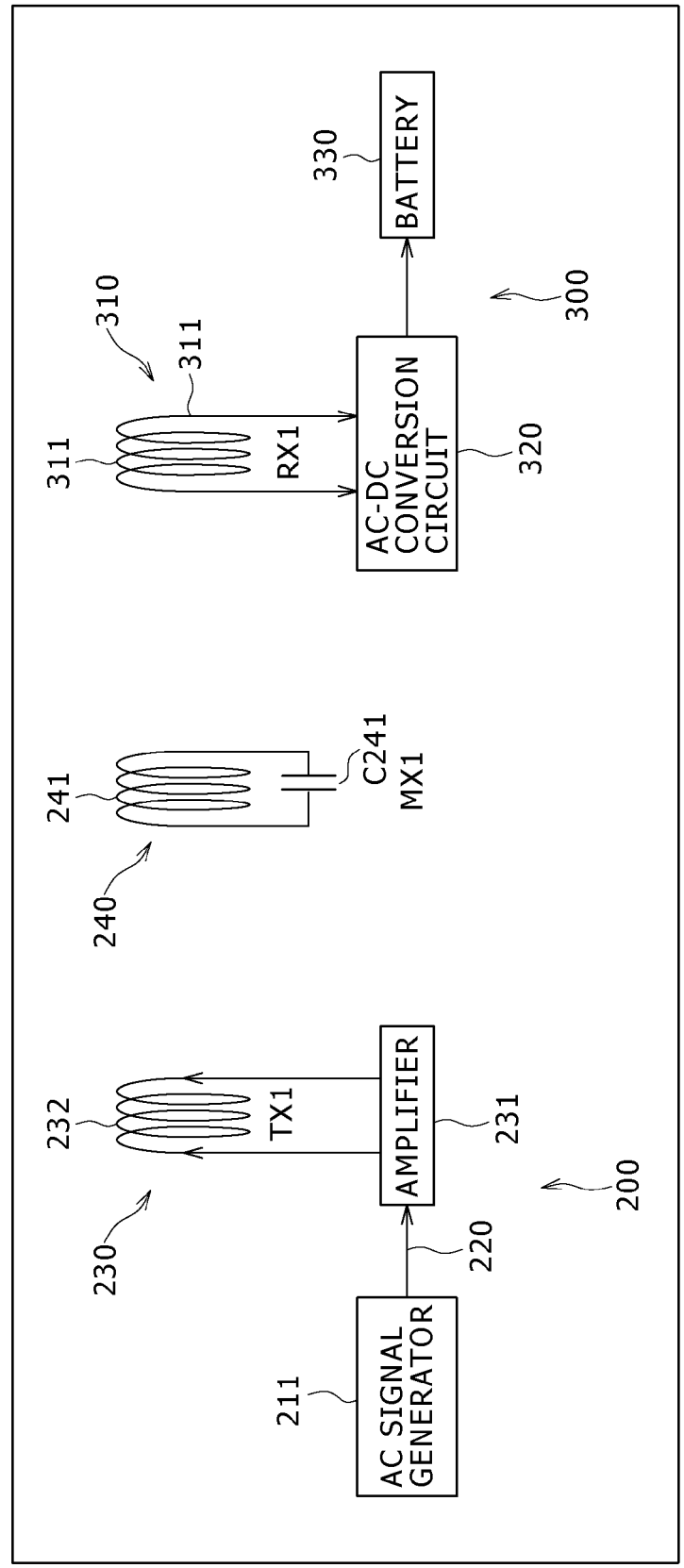
FIG. 4 is a diagram showing equivalent blocks of the wireless electrical charging system according to the first embodiment.

FIG. 4 is a diagram showing equivalent blocks of the wireless electrical charging system 100 according to the first embodiment.

As shown in the figures, the wireless electrical charging system 100 includes a wireless electrical charging apparatus 200 also referred to as a wireless electrical charging stand and a power receiving apparatus 300 which is typically mounted on an electric car.

The wireless electrical charging apparatus 200 employs a power-supply unit 210, a power-supply cable 220, a power transferring device 230 and a power relaying device 240.

The power-supply unit 210 includes an AC power generator 211 for generating high-frequency AC power to be transferred to the power receiving apparatus 300 by adoption of a wireless power transferring technique.

The AC power generated by the AC power generator 211 is supplied to the power transferring device 230 through the power-supply cable 220.

The power transferring device 230 employs an amplifier 231 and a power-supplying-side resonance coil 232 which functions as a first resonance element.

The amplifier 231 is a component for amplifying the AC power supplied thereto by the AC power generator 211 through the power-supply cable 220 and supplying the amplified power to the power-supplying-side resonance coil 232.

The first resonance element serves as a power-supplying-side resonator TX1. The power-supplying-side resonance coil 232 functioning as the power-supplying-side resonator TX1 transfers the AC power supplied thereto by the amplifier 231 to the power receiving apparatus 300 by adoption of the wireless power transferring technique with a high degree of efficiency.

The resonance coil is also referred to as a ringing coil. However, in this specification describing embodiments of the present invention, the technical terms 'resonance coil' and 'resonance' are deliberately used in place of the technical terms 'ringing coil' and 'ringing' respectively.

The power relaying device 240 has a power relaying coil 241 functioning as a second resonance element which can be coupled to the power-supplying-side resonance coil 232 of the power transferring device 230 by making use of a magnetic-field resonance relation.

The second resonance element serves as an intermediate-stage resonator MX1.

When the self-resonance frequency of the power relaying coil 241 matches that of the power-supplying-side resonance coil 232 employed in the power transferring device 230, a magnetic-field resonance relation is established, allowing power to be transferred from the power-supplying-side resonance coil 232 to the power relaying coil 241 with a high degree of efficiency.

By the same token, when the self-resonance frequency of the power relaying coil 241 matches that of a power-receiving-side resonance coil 311 employed in a power receiving device 310 included in the power receiving apparatus 300, a magnetic-field resonance relation is established, allowing power to be transferred from the power relaying coil 241 to the power-receiving-side resonance coil 311 with a high degree of efficiency.

The power relaying device 240 is a resonance circuit composing of the power relaying coil 241 and a stray capacitor of the power relaying coil 241 or a capacitor C241 which is connected to the power relaying coil 241 to form a parallel circuit in conjunction with the power relaying coil 241.

The power relaying device 240 is accommodated in a space under the ground surface of an electrical charging area CARA of the wireless electrical charging apparatus 200. If necessary, control is carried out to move the power relaying device 240 to a power relaying position between the power transferring device 230 and the power receiving device 310 as shown in the diagram which serves as FIG. 3.

Later description will explain details of a mechanism for moving the power relaying device 240, the control carried out to move the power relaying device 240 to the power relaying position and other things related thereto.

The power receiving apparatus 300 mounted on an electric car CAR employs the power receiving device 310 cited above, an AC-DC conversion circuit 320 and a battery 330 to be electrically charged with power received from the wireless electrical charging apparatus 200.

The power receiving device 310 is typically provided on the bottom of the electric car CAR.

The power receiving device 310 employs the aforementioned power-receiving-side resonance coil 311 serving as a power-receiving-side resonator RX1 which is a third resonance element.

As described above, when the self-resonance frequency of the power relaying coil 241 employed in the power relaying device 240 matches that of a power-receiving-side resonance coil 311, a magnetic-field resonance relation is established, allowing power to be transferred from the power relaying coil 241 to the power-receiving-side resonance coil 311 with a high degree of efficiency.

The AC-DC conversion circuit 320 is a component for rectifying AC (alternating current) power received by the power receiving device 310 and outputting DC (direct current) power as a result of the rectification to the battery 330 which serves as a load borne by the AC-DC conversion circuit 320. The DC power is supplied to the battery 330 as a voltage, electrically charging the battery 330.

As described above, the wireless electrical charging system 100 according to this embodiment is configured to include three resonators, i.e., the power-supplying-side resonator TX1, the intermediate-stage resonator MX1 and the power-receiving-side resonator RX1 which function as the first, second and third resonance elements respectively.

[System Outline]

Figure 5:
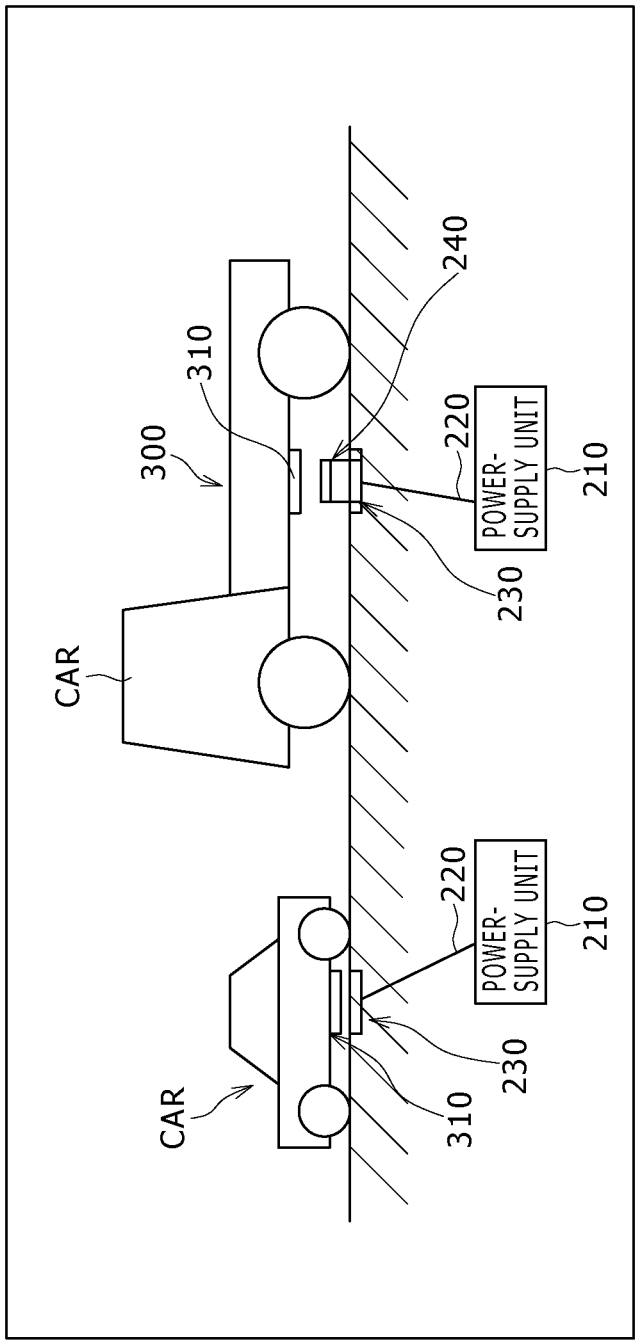
FIG. 5 is a diagram showing a configuration of the wireless electrical charging system according to the first embodiment making use of a power relaying device on the right-hand side and a configuration of the wireless electrical charging system according to the first embodiment not making use of the power relaying device on the left-hand side.

FIG. 5 is a diagram showing a configuration of a wireless electrical charging system 100 according to the first embodiment making use of a power relaying device 240 on the right-hand side and a configuration of a wireless electrical charging system 100 according to the first embodiment not making use of the power relaying device 240 on the left-hand side.

By providing a power relaying coil 241 for relaying power from the wireless electrical charging apparatus 200 to the power receiving apparatus 300 at a position between the power-supplying-side resonance coil 232 and the power-receiving-side resonance coil 311 in the configuration of the wireless electrical charging system 100 according to the first embodiment, the power can be transferred from the wireless electrical charging apparatus 200 to the power receiving apparatus 300 with a high degree of efficiency even if the distance between the power-supplying-side resonance coil 232 and the power-receiving-side resonance coil 311 is long. The power relaying coil 241 is also referred to as a repeater coil.

In addition, the power relaying coil 241 is provided physically as a standalone element which does not require a connection cable at all. On top of that, the power relaying coil 241 is configured to serve as a coil, the position of which can be changed with ease. A position changing mechanism for changing the position of the power relaying coil 241 will be described later in detail.

The electrical circuit of the power relaying coil 241 is configured to compose of only an inductor L and a capacitor C. The resonance frequency of the power relaying coil 241 is set at the frequency of a propagating AC magnetic field.

That is to say, in the wireless electrical charging system 100, by placing the power relaying device 240 at a selected position between the power-supplying-side resonance coil 232 and the power-receiving-side resonance coil 311 as shown in the right-hand side diagram of FIG. 5, the efficiency of a power transfer between the power-supplying-side resonance coil 232 and the power-receiving-side resonance coil 311 can be raised even if the vehicle has a large size. This is because the power relaying device 240 is a device for allowing the power transfer distance between the power-supplying-side resonance coil 232 and the power-receiving-side resonance coil 311 to be lengthened by relaying power transferred by the power-supplying-side resonance coil 232 to the power-receiving-side resonance coil 311.

Since the power relaying coil 241 employed in the power relaying device 240 does not require a cable or the like to be connected thereto and has an extremely simple structure with a small weight, a mechanism for holding, moving and replacing the power relaying device 240 can also be made very simple as well.

In addition, as shown in the left-side diagram of FIG. 5, when electrically charging a passenger car CAR, the power relaying device 240 also referred to as a repeater is not required. In such a case, the power relaying device 240 can be saved in a space in the ground or the like so that power can be transferred from the wireless electrical charging apparatus 200 to the power receiving apparatus 300 mounted on the passenger car CAR by making use of only the power-supplying-side resonance coil 232 and power-receiving-side resonance coil 311. In an operation to transfer power from the wireless electrical charging apparatus 200 to the power receiving apparatus 300 mounted on a vehicle having a large size, on the other hand, the power relaying device 240 is placed at the selected position between the power-supplying-side resonance coil 232 and power-receiving-side resonance coil 311 so as to electrically charge the power receiving apparatus 300.

Thus, the passenger car CAR can be electrically charged by making use of the power-supplying-side resonance coil 232 and power-receiving-side resonance coil 311 whereas a vehicle having a large size is electrically charged by placing the power relaying device 240 at a selected position between the power-supplying-side resonance coil 232 and power-receiving-side resonance coil 311. In this way, the wireless electrical charging system 100 can be used for electrically charging a passenger car having a small size as well as a vehicle having a large size.

The following description explains a case in which the power relaying device 240 is required for electrically charging a vehicle having a large size and a case in which the power relaying device 240 is not required electrically charging a passenger car having a small size.

Figure 6:
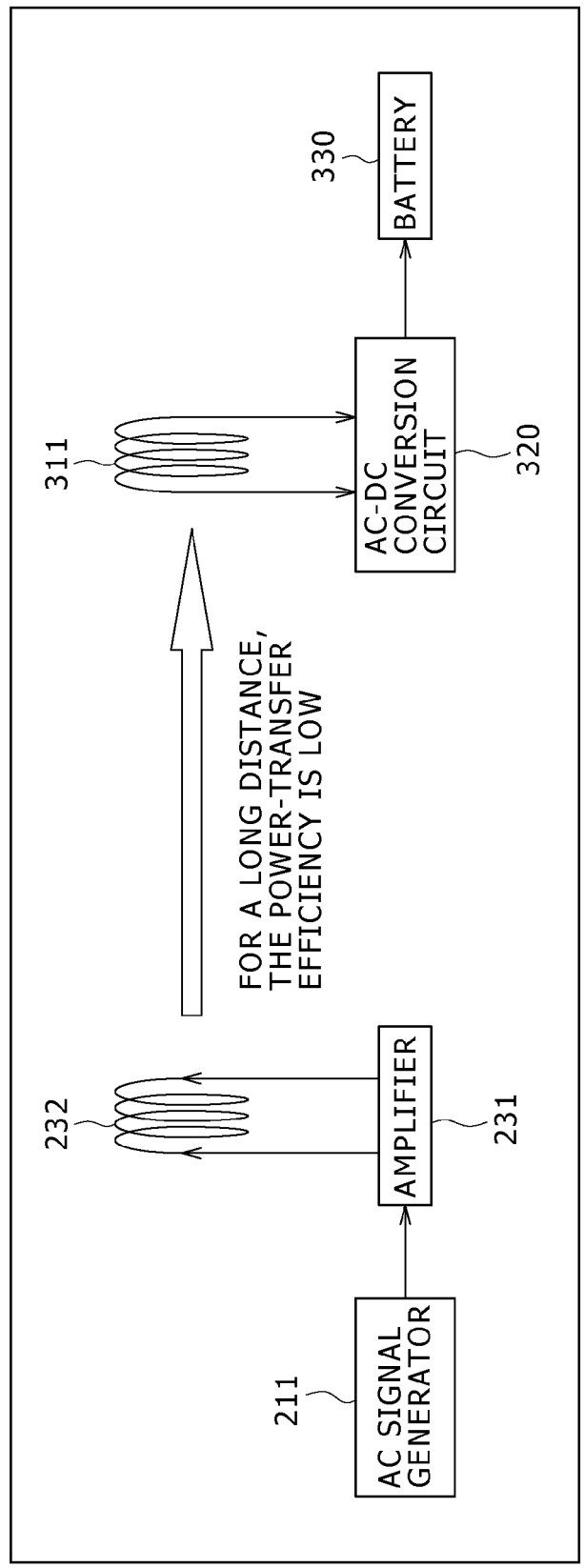
FIG. 6 is a diagram showing equivalent blocks of a wireless electrical charging system not making use of the power relaying device.

FIG. 6 is a diagram showing equivalent blocks of a wireless electrical charging system not making use of the power relaying device 240.

Figure 7:
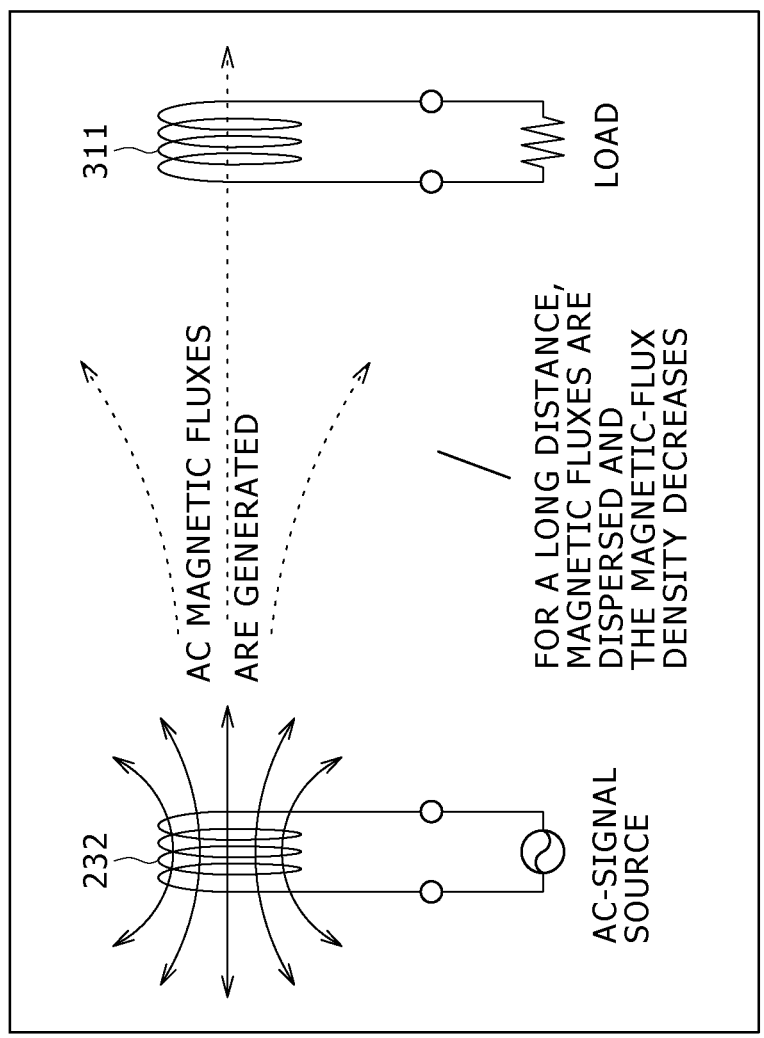
FIG. 7 is an explanatory diagram to be referred to in description of an outline of a power transferring operation in the wireless electrical charging system shown in the diagram serving as FIG. 6 for a case in which a resonance coil provided on a power supplying side is separated away from a resonance coil provided on a power receiving side, that is, for a case in which the vehicle has a large size.

On the other hand, FIG. 7 is an explanatory diagram to be referred to in description of an outline of a power transferring operation in the wireless electrical charging system shown in the diagram serving as FIG. 6 for a case in which a resonance coil 232 provided on a power supplying side is separated away from a resonance coil 311 provided on a power receiving side, that is, for a case in which the vehicle has a large size.

In this case, the power-supplying-side resonance coil 232 employed in the power transferring device 230 generates AC magnetic fluxes.

The power-receiving-side resonance coil 311 employed in the power receiving device 310 receives the AC magnetic fluxes generated by the power-supplying-side resonance coil 232, generating an electromotive force in the power-receiving-side resonance coil 311.

If the power-supplying-side resonance coil 232 and the power-receiving-side resonance coil 311 are separated away from each other, the AC magnetic fluxes generated by the power-supplying-side resonance coil 232 are dispersed to result in a small magnetic-flux density.

If the density of the AC magnetic fluxes received by the power-receiving-side resonance coil 311 is small, the electromotive force generated by the power-receiving-side resonance coil 311 is also small.

Thus, if the power-supplying-side resonance coil 232 and the power-receiving-side resonance coil 311 are close to each other as is the case with a passenger car, power can be transferred from the power-supplying-side resonance coil 232 to the power-receiving-side resonance coil 311 with a high degree of efficiency even without inserting the power relaying device 240 into a position between the power-supplying-side resonance coil 232 and the power-receiving-side resonance coil 311. If the power-supplying-side resonance coil 232 and the power-receiving-side resonance coil 311 are separated away from each other as is the case with a large-size vehicle such as a truck or a bus, however, it is difficult to transfer power from the power-supplying-side resonance coil 232 to the power-receiving-side resonance coil 311 with a high degree of efficiency unless the power relaying device 240 is inserted into a position between the power-supplying-side resonance coil 232 and the power-receiving-side resonance coil 311.

Figure 8:
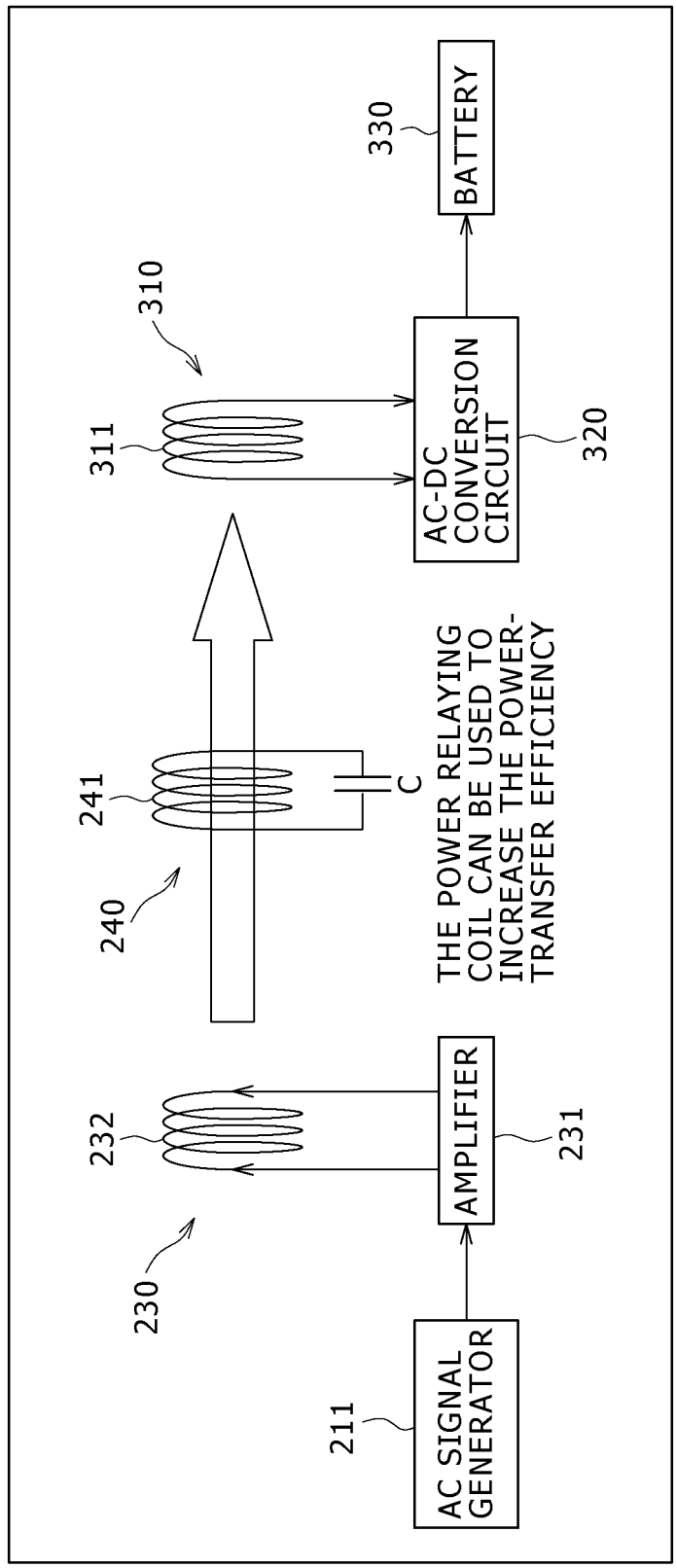
FIG. 8 is a diagram showing equivalent blocks of a wireless electrical charging system making use of the power relaying device.

FIG. 8 is a diagram showing equivalent blocks of a wireless electrical charging system making use of the power relaying device 240.

Figure 9:
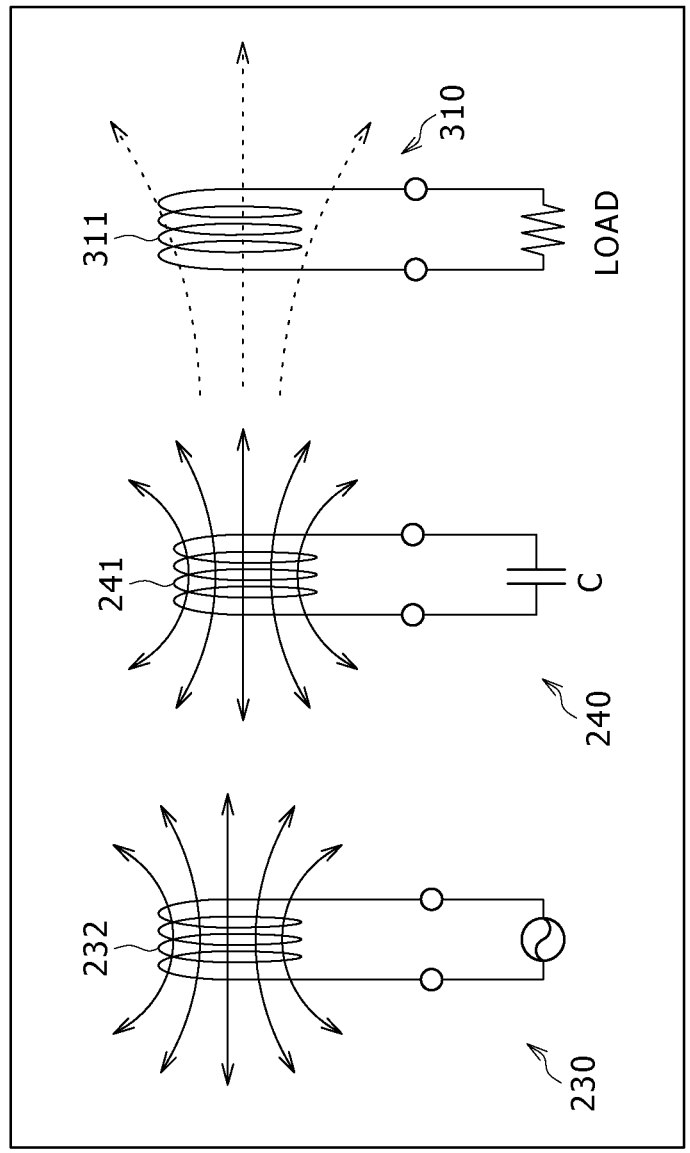
FIG. 9 is an explanatory diagram to be referred to in description of an outline of a power transferring operation in the wireless electrical charging system shown in the diagram serving as FIG. 8 for a case in which a resonance coil provided on a power supplying side is separated away from a resonance coil provided on a power receiving side, that is, for a case in which the vehicle has a large size.

On the other hand, FIG. 9 is an explanatory diagram to be referred to in description of an outline of a power transferring operation in the wireless electrical charging system shown in the diagram serving as FIG. 8 for a case in which a resonance coil 232 provided on a power supplying side is separated away from a resonance coil 311 provided on a power receiving side, that is, for a case in which the vehicle has a large size.

In this case, the power relaying coil 241 employed in the power relaying device 240 receives AC magnetic fluxes generated by the power-supplying-side resonance coil 232.

Since the power relaying coil 241 is a resonance circuit having a coil and a capacitor, the power relaying coil 241 generates an electromotive force with a shifted phase. Thus, strong magnetic fluxes are generated also in a space surrounding the power relaying coil 241.

Since the power-receiving-side resonance coil 311 employed in the power receiving device 310 receives the AC magnetic fluxes generated by the power relaying coil 241 separated away from the power-receiving-side resonance coil 311 by a short distance, the power-receiving-side resonance coil 311 generates a large electromotive force.

[Mechanism for Moving (Including and Excluding) Power Relaying Device]

Next, the following description explains a mechanism for moving (including and excluding) the power relaying device 240.

FIGS. 10A and B are diagrams showing a typical configuration of a first power-relaying-device moving (including and excluding) mechanism section 260 included in the wireless electrical charging apparatus 200 to serve as a section according to an embodiment.

In the wireless electrical charging apparatus 200, a power-supplying-relay accommodation section 250 for accommodating an includable and excludable power relaying device 240 is created in a space under the ground surface of an electrical charging area CARA.

That is to say, the power relaying device 240 can be put in the power-supplying-relay accommodation section 250.

It is to be noted that, in this embodiment, the power-supplying-relay accommodation section 250 has an area for setting a state of not relaying power transferred from the power transferring device 230 to the power receiving apparatus 300.

In addition, an area between the position of the power transferring device 230 and the position of the power receiving device 310 is a predetermined power relaying area allowing power to be transferred from the power transferring device 230 to the power receiving device 310.

As shown in the diagrams serving as FIGS. 10A and 10B, a power-relaying-device moving mechanism section 260 for moving the power relaying device 240 is configured to function as a section which can be rotated around a rotation axis 261 all but parallel to the surface of the ground by a driving motor not shown in the diagrams serving as FIGS. 10A and 10B.

When the power relaying device 240 is not used, the power relaying device 240 is accommodated in the power-supplying-relay accommodation section 250 in such a state that a coil parallel location surface 241a of the power relaying coil 241 is oriented in a direction rotated by 90 degrees with respect to a coil parallel location surface 232a of the power-supplying-side resonance coil 232 as shown in the diagram which serves as FIG. 10A. With the power relaying device 240 accommodated in such a state, there will be no effect on the power-supplying-side resonance coil 232 employed in the power transferring device 230.

In order to make use of the power relaying device 240 in an operation to transfer power from the power transferring device 230 to the power receiving device 310, it is necessary to rotate the power relaying device 240 from the accommodation state described above by 90 degrees so that the coil parallel location surface 241a of the power relaying coil 241 is oriented in a direction parallel to the coil parallel location surface 232a of the power-supplying-side resonance coil 232.

Then, as shown in the diagram serving as FIG. 10B, an elevating machine not shown in the diagrams serving as FIGS. 10A and 10B raises the power relaying device 240 from the power-supplying-relay accommodation section 250 to a position separated away by a distance determined in advance from the power-supplying-side resonance coil 232 employed in the power transferring device 230 which appears on the ground, being located approximately on the surface of the ground. That is to say, the power relaying device 240 is controlled to move to a power relaying position between the power transferring device 230 and the power receiving device 310.

In order to accommodate the power relaying device 240 back in the power-supplying-relay accommodation section 250, the elevating machine lowers the power relaying device 240 to place the power relaying device 240 inside the power-supplying-relay accommodation section 250. Then, the power relaying device 240 is rotated so that the coil parallel location surface 241a of the power relaying coil 241 is oriented in a direction rotated by 90 degrees with respect to the coil parallel location surface 232a of the power-supplying-side resonance coil 232 as shown in the diagram which serves as FIG. 10A.

Figure 11A:
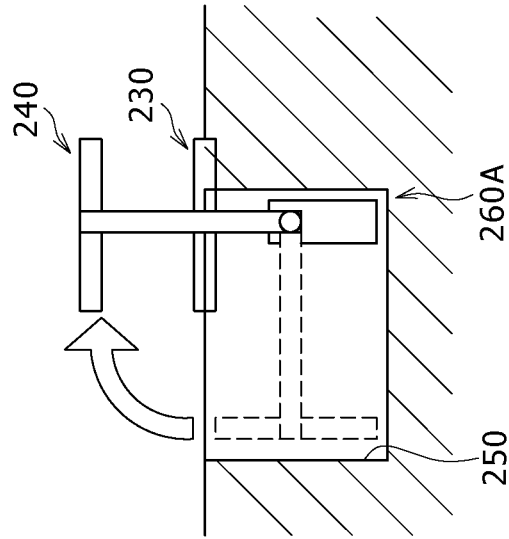
FIGS. 11A and 11B are diagrams showing a typical configuration of a second power-relaying-device moving (including and excluding) mechanism section employed in a wireless electrical charging apparatus in accordance with the embodiment.
Figure 11B:
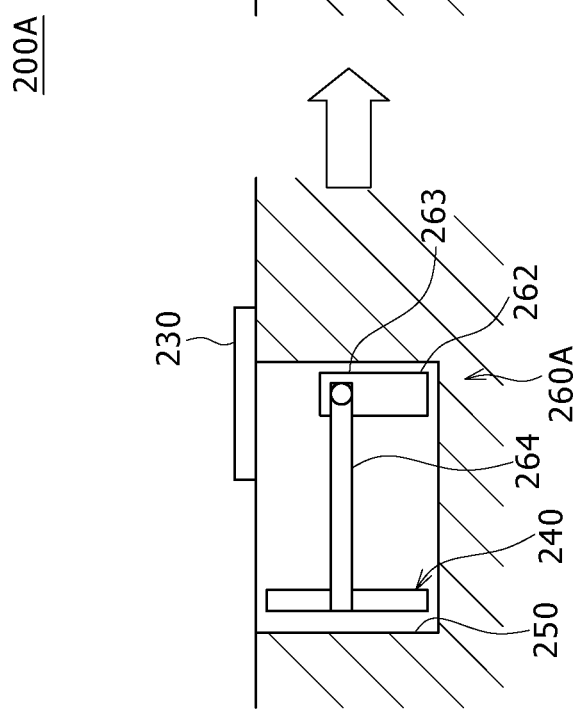

FIGS. 11A and 11B are diagrams showing a typical configuration of a second power-relaying-device moving (including and excluding) mechanism section 260A included in the wireless electrical charging apparatus 200A to serve as a section according to the embodiment.

The second power-relaying-device moving mechanism section 260A according to the embodiment has a supporter 264 on a main body 262 which is accommodated in a power-relaying-device accommodation section 250. The supporter 264 can be rotated by a driving motor not shown in the diagrams serving as FIGS. 11A and 11B around a rotation axis 263 which serves as the center of rotation. The rotation axis 263 is all but parallel to the surface of the ground. The power relaying device 240 is attached to the end of the supporter 264.

When the power relaying device 240 is not used, the power relaying device 240 is accommodated inside the power-supplying-relay accommodation section 250 as shown in the diagram which serves as FIG. 11A. To be more specific, the power relaying device 240 is accommodated at a position separated away from the power-supplying-side resonance coil 232 employed in the power transferring device 230 so that the power relaying device 240 gives no effect on the power-supplying-side resonance coil 232. To be even more specific, the power relaying device 240 is accommodated in the power-supplying-relay accommodation section 250 so that the coil parallel location surface 241a of the power relaying coil 241 is oriented in a direction rotated by 90 degrees with respect to the coil parallel location surface 232a of the power-supplying-side resonance coil 232.

In order to make use of the power relaying device 240 in an operation to transfer power from the power transferring device 230 to the power receiving device 310 in this typical configuration of the second power-relaying-device moving mechanism section 260A, the rotation axis 263 of the second power-relaying-device moving mechanism section 260A is rotated by 90 degrees in the clockwise direction as shown in the diagram which serves as FIG. 11B.

By rotating the rotation axis 263 of the second power-relaying-device moving mechanism section 260A as described above, the power relaying device 240 can be raised from the power-supplying-relay accommodation section 250 to a position separated away by a distance determined in advance from the power-supplying-side resonance coil 232 employed in the power transferring device 230 which appears on the ground, being located approximately on the surface of the ground. That is to say, the power relaying device 240 is controlled to move to a power relaying position between the power transferring device 230 and the power receiving device 310. In order to accommodate the power relaying device 240 back in the power-supplying-relay accommodation section 250, the rotation axis 263 of the second power-relaying-device moving mechanism section 260A is rotated by 90 degrees in the counterclockwise direction.

To put it in detail, the power relaying device 240 is accommodated in the power-supplying-relay accommodation section 250 as shown in the diagram which serves as FIG. 11A. To be more specific, the power relaying device 240 is accommodated at a position separated away from the power-supplying-side resonance coil 232 employed in the power transferring device 230 so that the coil parallel location surface 241a of the power relaying coil 241 is oriented in a direction rotated by 90 degrees with respect to the coil parallel location surface 232a of the power-supplying-side resonance coil 232 as shown in the diagram which serves as FIG. 11A.

FIGS. 12A and 12B are diagrams showing a typical configuration of a third power-relaying-device moving (including and excluding) mechanism section 260B included in the wireless electrical charging apparatus 200B to serve as a section according to a further embodiment.

The typical configuration of the third power-relaying-device moving mechanism section 260B shown in the diagrams serving as FIGS. 12A and 12B is different from the typical configuration of the second power-relaying-device moving mechanism section 260A shown in the diagrams serving as FIGS. 11A and 11B in that, in the case of the embodiment shown in the diagrams serving as FIGS. 12A and 12B, the third power-relaying-device moving mechanism section 260B is configured to be movable in the X-axis direction parallel to the surface of the ground over the bottom 251 of the power-supplying-relay accommodation section 250B. In the diagrams which serve as FIGS. 12A and 12B, the direction of the X axis is the horizontal direction.

The movement of the third power-relaying-device moving mechanism section 260B is controlled in order to place the power relaying device 240 at an optimum power relaying position between the power transferring device 230 and the power receiving device 310 so that power is transferred from the power transferring device 230 to the power receiving device 310 with a high degree of efficiency.

In order to make use of the power relaying device 240 in an operation to transfer power from the power transferring device 230 to the power receiving device 310, the supporter 264 is rotated in the clockwise direction by 90 degrees so as to put the power relaying device 240 in a state of being erected as shown in the diagram which serves as FIG. 12A. With the power relaying device 240 erected, the third power-relaying-device moving mechanism section 260B is moved in the horizontal direction toward the position of the power transferring device 230 as shown in the diagram which serves as FIG. 12B.

Then, the optimum power relaying position between the power-supplying-side resonance coil 232 and the power-receiving-side resonance coil 311 is determined.

That is to say, the optimum power relaying position of the power relaying device 240 is determined by moving the power relaying device 240 within a certain range in such a way that the power received by the power-receiving-side resonance coil 311 is maximized.

The control carried out to move the power relaying device 240 to the optimum power relaying position is explained by giving two concrete examples as follows.

FIG. 13 is a diagram showing a model of a first typical wireless electrical charging system 100C carrying out control to move the power relaying device 240 to an optimum power relaying position in accordance with the embodiment.

FIG. 14 is a block diagram showing a signal processing system employed in the first typical wireless electrical charging system 100C carrying out control to move the power relaying device 240 to an optimum power relaying position in accordance with the embodiment.

As shown in the block diagram which serves as FIG. 14, a power receiving apparatus 300C mounted on an electric car CAR has a power-receiving-side radio communication unit 340 for transmitting a power receiving state to a wireless electrical charging apparatus 200C (also referred to as a wireless electrical charging stand 200C) provided on the power supplying side.

In addition, the power receiving apparatus 300C also employs a level detection circuit 350 and a power-receiving-side power-transfer control section 360.

The level detection circuit 350 is a section for detecting the level of power received by the power-receiving-side resonance coil 311 employed in the power receiving device 310 of the power receiving apparatus 300C and supplying information on the level of power received by the power-receiving-side resonance coil 311 to the power-receiving-side power-transfer control section 360.

The power-receiving-side power-transfer control section 360 is a section for carrying out control to drive the power-receiving-side radio communication unit 340 to provide the wireless electrical charging apparatus 200C (or the wireless electrical charging stand 200C) provided on the power supplying side with information which has been received by the power-receiving-side power-transfer control section 360 from the level detection circuit 350 as the information on the level of power received by the power-receiving-side resonance coil 311. The information indicates the power receiving state cited above.

In addition, the power-receiving-side power-transfer control section 360 also carries out control to drive the power-receiving-side radio communication unit 340 to issue a request for an electrical charging operation to the wireless electrical charging apparatus 200C (or the wireless electrical charging stand 200C) provided on the power supplying side.

As shown in the block diagram which serves as FIG. 14, the wireless electrical charging apparatus 200C employs a power-supplying-side radio communication unit 270 and a power-supplying-side power-transfer control section 280.

The power-supplying-side radio communication unit 270 is a unit for receiving radio information from the power-receiving-side radio communication unit 340 employed in the power receiving apparatus 300C.

The power-supplying-side power-transfer control section 280 is a section for controlling the movement of the third power-relaying-device moving mechanism section 260B and controlling an operation carried out by the power transferring device 230 to transfer power to the power receiving apparatus 300C in accordance with the radio information received from the power-supplying-side radio communication unit 270.

Figure 15:
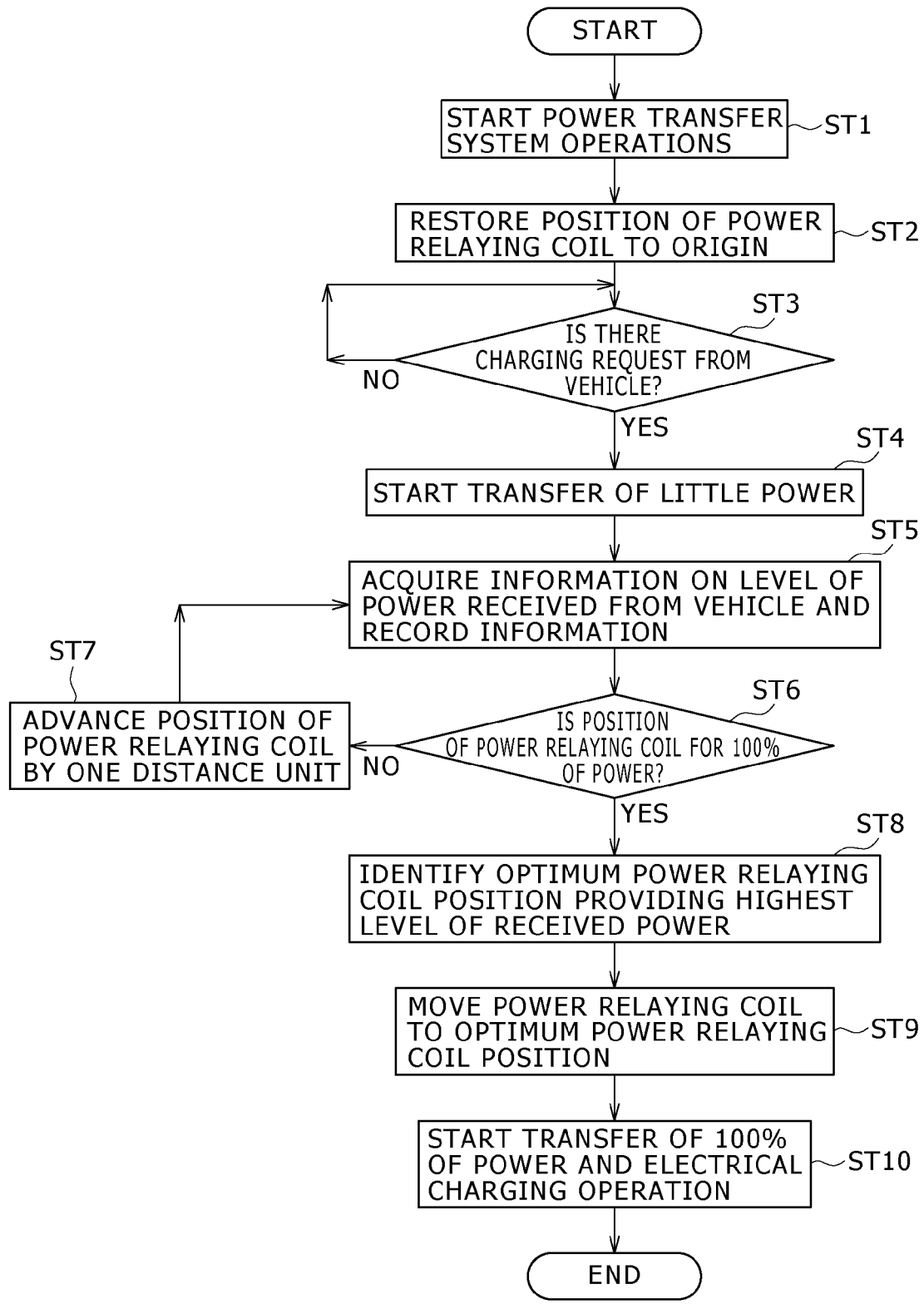
FIG. 15 shows a flowchart representing an outline of operations performed by the first typical wireless electrical charging system carrying out control to move the power relaying device to an optimum power relaying position in accordance with the embodiment.

FIG. 15 shows a flowchart representing an outline of operations performed by the first typical wireless electrical charging system 100C carrying out control to move the power relaying device 240 to an optimum power relaying position in accordance with the embodiment.

As shown in the figure, the flowchart begins with a step ST1 at which the wireless electrical charging system 100C including the wireless electrical charging apparatus 200C provided on the power supplying side starts execution of the operations. Then, at the next step ST2, the third power-relaying-device moving mechanism section 260B restores the position of the power relaying coil 241 to the original point.

As the power-receiving-side resonance coil 311 provided on the vehicle CAR arrives at a position in close proximity to the power-supplying-side resonance coil 232, putting the power receiving device 310 in a state of being capable of receiving power from the power transferring device 230, at the next step ST3, the power-receiving-side power-transfer control section 360 provided on the vehicle CAR notifies the power-supplying-side power-transfer control section 280 through a radio communication between the power-receiving-side radio communication unit 340 and the power-supplying-side radio communication unit 270 that the power receiving device 310 has been put in a state of being capable of receiving power from the power transferring device 230.

Notified by the power-receiving-side power-transfer control section 360 that the power receiving device 310 has been put in a state of being capable of receiving power from the power transferring device 230, the power-supplying-side power-transfer control section 280 carries out control to transfer power from the power-supplying-side resonance coil 232. The power is not 100% of power to be transferred from the wireless electrical charging apparatus 200C to the power receiving apparatus 300C. That is to say, the power-supplying-side power-transfer control section 280 carries out control to transfer little power from the power-supplying-side resonance coil 232 to the power receiving apparatus 300C. As a result, at the next step ST4, the transfer of the little power is started.

The level detection circuit 350 detects the level of the power received by the power receiving apparatus 300C employed by the wireless electrical charging system 100C on the power receiving side. The power receiving apparatus 300C transmits information on the level of the power received by the level detection circuit 350 to the wireless electrical charging apparatus 200C employed by the wireless electrical charging system 100C on the power supplying side through the radio communication between the power-receiving-side radio communication unit 340 and the power-supplying-side radio communication unit 270.

At subsequent steps ST5 to ST8, in the wireless electrical charging apparatus 200C, while the power-supplying-side radio communication unit 270 is monitoring the information on the level of the power received by the level detection circuit 350 provided on the power receiving side, the power-supplying-side power-transfer control section 280 controls the third power-relaying-device moving mechanism section 260B so as to move the power relaying coil 241 to a position within an operating range and, then, the power-supplying-side power-transfer control section 280 scans the monitored levels of the power received by the level detection circuit 350 for a highest power level in order to identify (or determine) the position of the power relaying coil 241 for the highest power level. That is to say, the power-supplying-side power-transfer control section 280 identifies the position of the power relaying coil 241 as a position at which the power relaying coil 241 is located at the time the highest power level is detected.

Then, at the next step ST9, the power-supplying-side power-transfer control section 280 moves the power relaying coil 241 to the identified position. Subsequently, at the next step ST10, the power-supplying-side power-transfer control section 280 controls the power transferring device 230 so as to carry out an electrical charging operation for transferring 100% of the power to the power receiving apparatus 300C.

Figure 16:
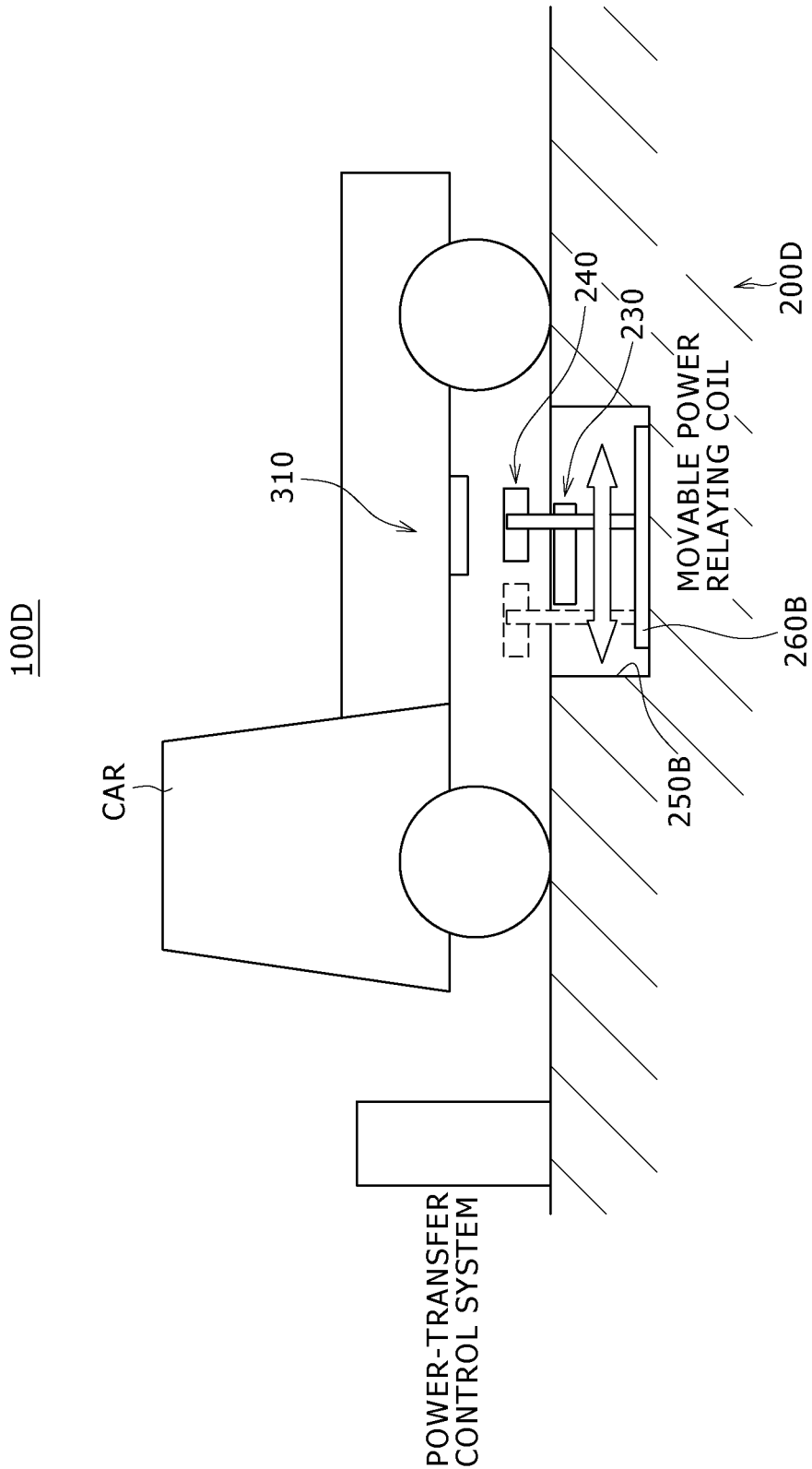
FIG. 16 is a diagram showing a model of a second typical wireless electrical charging system carrying out control to move the power relaying device to an optimum power relaying position in accordance with the embodiment.

FIG. 16 is a diagram showing a model of a second typical wireless electrical charging system 100D carrying out control to move the power relaying device 240 to an optimum power relaying position in accordance with the embodiment.

Figure 17:
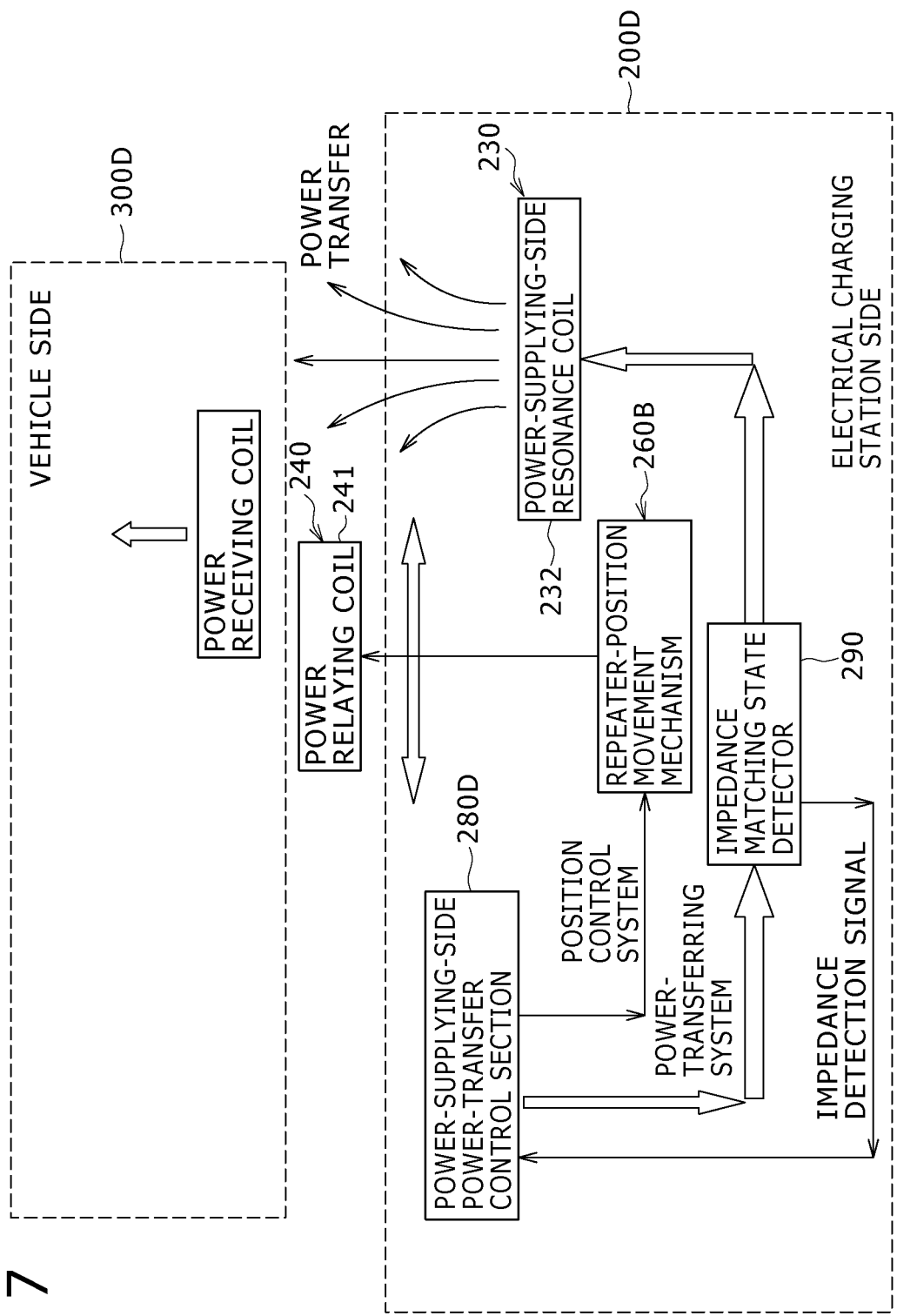
FIG. 17 is a block diagram showing a signal processing system employed in the second typical wireless electrical charging system carrying out control to move the power relaying device to an optimum power relaying position in accordance with the embodiment.

FIG. 17 is a block diagram showing a signal processing system employed in the second typical wireless electrical charging system 100D carrying out control to move the power relaying device 240 to an optimum power relaying position in accordance with the embodiment.

The following description explains differences between the second typical wireless electrical charging system 100D shown in the diagrams serving as FIGS. 16 and 17 from the first typical wireless electrical charging system 100C shown in the diagrams which serve as FIGS. 13 and 14.

In the case of the second typical wireless electrical charging system 100D, radio communications are not resorted to. Instead, the wireless electrical charging apparatus 200D employs an impedance matching detector 290 for detecting an impedance state from a transferred-power signal generated on the power supplying side. When the impedance state indicates that impedance matching is optimum, the wireless electrical charging apparatus 200D determines that power has been transferred from the wireless electrical charging apparatus 200D to the power receiving apparatus 300D with a high degree of efficiency. A position at which the power relaying coil 241 is located at the optimum impedance matching is identified as the optimum power relaying position of the power relaying coil 241.

By making use of typically a high-frequency coupler, the impedance matching detector 290 measures a travelling-direction power wave and a reflection-direction power wave, computing a reflection ratio which is defined as a ratio of the reflection-direction power wave to the travelling-direction power wave.

A power-transfer control section 280D controls a third power-relaying-device moving mechanism section 260B to move the power relaying coil 241. A state providing a smallest reflection ratio is determined as an impedance matching state in which the power relaying coil 241 is located at the optimum power relaying position. In this way, the optimum power relaying position of the power relaying coil 241 can be determined.

In accordance with another method adopted for this other embodiment, the impedance matching detector 290 measures the waveform of a voltage and the waveform of a current. Differences in phase between the waveform of the voltage and the waveform of the current are then compared with each other by making use of a phase comparator. A smallest difference in phase between the waveform of the voltage and the waveform of the current indicates an impedance matching state in which the power relaying coil 241 is located at the optimum power relaying position. In this way, the optimum power relaying position of the power relaying coil 241 can be determined.

Figure 18:
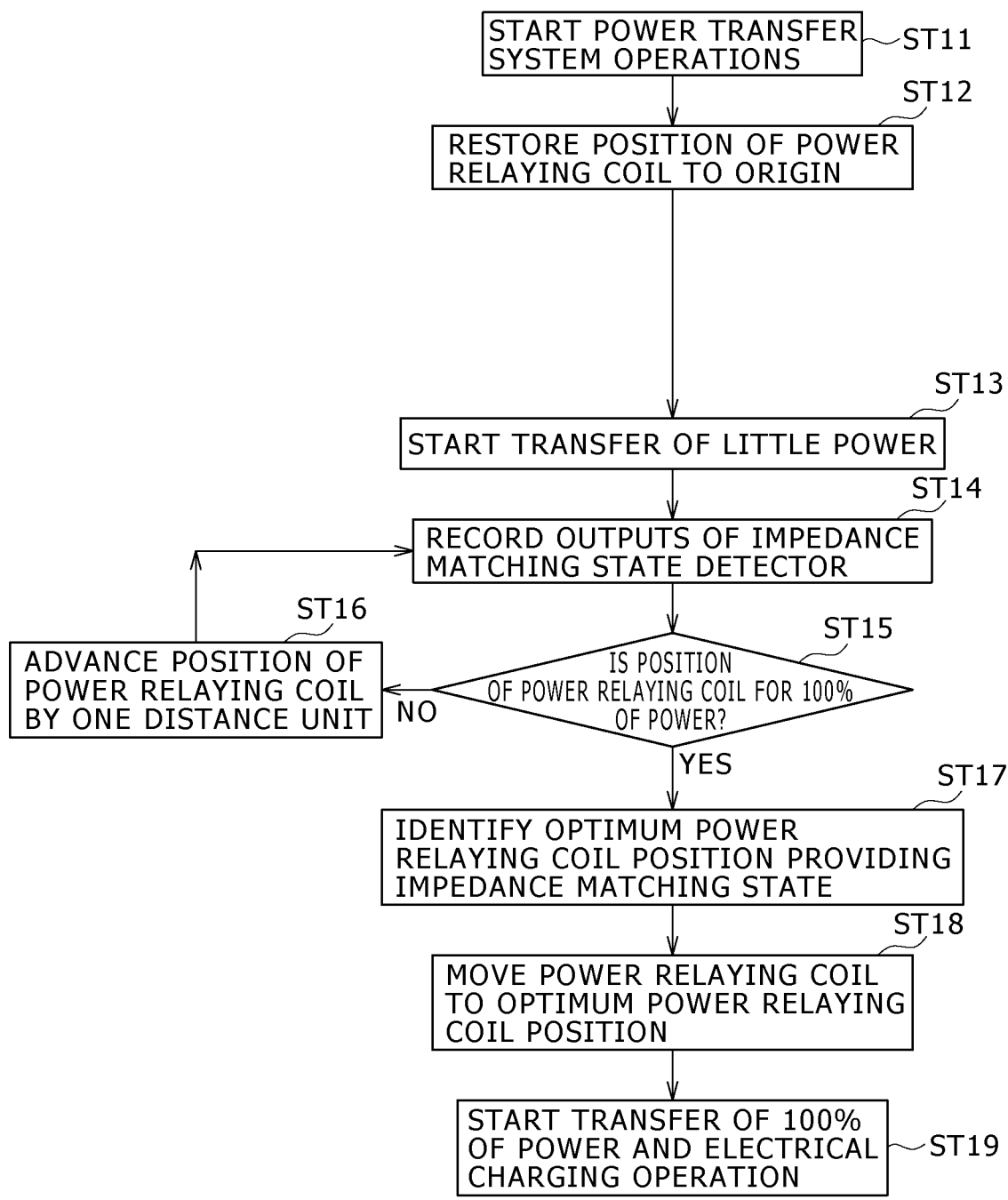
FIG. 18 shows a flowchart representing an outline of operations performed by the second typical wireless electrical charging system carrying out control to move the power relaying device to an optimum power relaying position in accordance with the embodiment.

FIG. 18 shows a flowchart representing an outline of operations performed by the second typical wireless electrical charging system 100D carrying out control to move the power relaying device 240 to an optimum power relaying position in accordance with the embodiment.

As shown in the figure, the flowchart begins with a step ST11 when the wireless electrical charging apparatus 200D employed in the wireless electrical charging system 100D to serve as an apparatus on the power supplying side starts execution of its operations. Then, at the next step ST12, the third power-relaying-device moving mechanism section 260B restores the position of the power relaying coil 241 to the original point.

When an electrical charging start button employed in the wireless electrical charging apparatus 200D is pressed, the power-transfer control section 280D carries out control to transfer power from the power-supplying-side resonance coil 232 to the power receiving apparatus 300D in response to the operation to press the electrical charging start button. The power is not 100% of power to be transferred from the wireless electrical charging apparatus 200D to the power receiving apparatus 300D. That is to say, the power-supplying-side power-transfer control section 280 carries out control to transfer little power from the power-supplying-side resonance coil 232 to the power receiving apparatus 300D. It is to be noted that the electrical charging start button is shown in none of the figures. As a result, at the next step ST13, the transfer of the little power is started.

The impedance matching detector 290 employed in the wireless electrical charging apparatus 200D detects the level of the impedance matching state.

At subsequent steps ST14 to ST17, in the wireless electrical charging apparatus 200D, while monitoring the detected levels of the impedance matching state, the power-transfer control section 280D controls the third power-relaying-device moving mechanism section 260B so as to move the power relaying coil 241 to a position within an operating range and, then, the power-transfer control section 280D scans the monitored levels of the impedance matching state for a highest level in order to identify (or determine) the position of the power relaying coil 241 for the highest level. That is to say, the power-transfer control section 280D identifies the position of the power relaying coil 241 as a position at which the power relaying coil 241 is located at the time the highest level is detected.

Then, at the next step ST18, the power-transfer control section 280D moves the power relaying coil 241 to the identified position. Subsequently, at the next step ST19, the power-transfer control section 280D controls the power transferring device 230 so as to carry out an electrical charging operation for transferring 100% of the power to the power receiving apparatus 300D.

Figure 19:
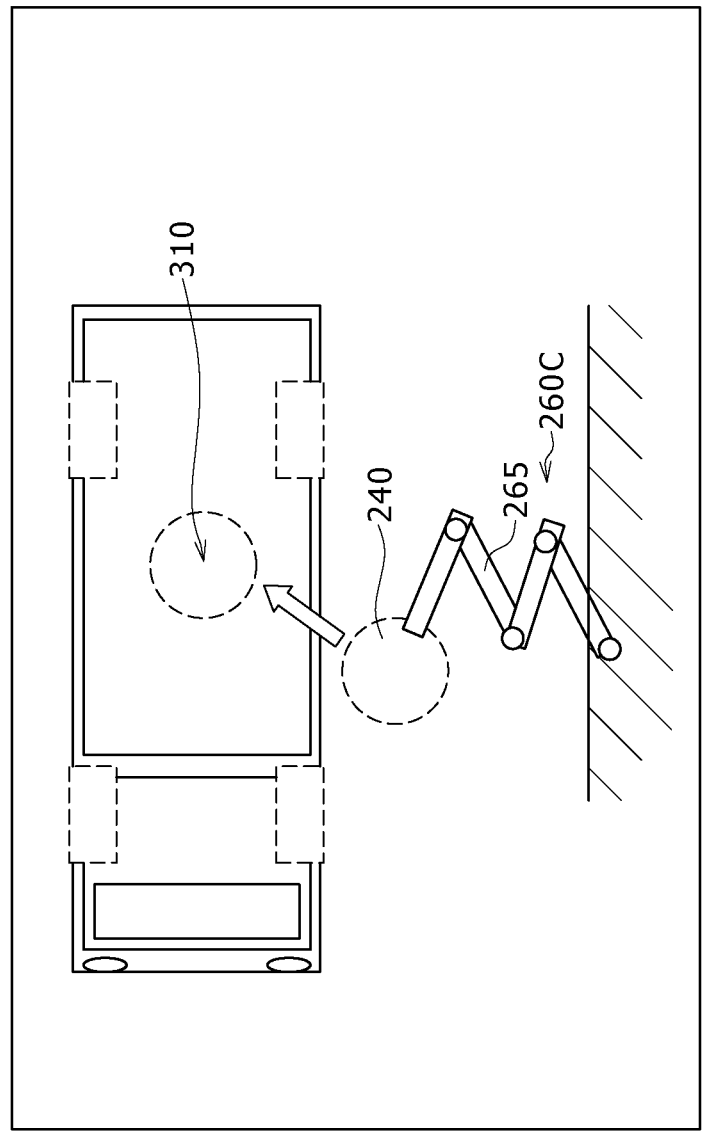
FIG. 19 is a diagram showing a fourth typical configuration of a power-relaying-device moving (including and excluding) mechanism section employed in a wireless electrical charging apparatus in accordance with the embodiment.

FIG. 19 is a diagram showing a fourth typical configuration of a power-relaying-device moving (including and excluding) mechanism section 260C according to the embodiment.

In the first to third typical configurations described before as the configurations of the power-relaying-device moving (including and excluding) mechanism sections 260, 260A and 260B respectively, the power relaying device 240 is raised and lowered in the vertical direction perpendicular to the surface of the ground or rotated. In the case of the fourth typical configuration of the power-relaying-device moving (including and excluding) mechanism section 260C, however, the power relaying device 240 is put in a position between the power transferring device 230 and the power receiving device 310 or taken out from such a position in the horizontal direction parallel to the surface of the ground. The fourth typical configuration of the power-relaying-device moving mechanism section 260C typically includes a freely folding supporter 255, at the end of which the power relaying device 240 is installed. The freely folding supporter 265 can be expanded or folded manually or by making use of electric power.

In the first embodiment described earlier, the power relaying device 240 for allowing the power transfer distance to be lengthened by relaying transferred power is placed at a selected position between the power-supplying-side resonance coil 232 and the power-receiving-side resonance coil 311. Thus, power can be transferred to even a vehicle having a large size with a high degree of efficiency.

Since the power relaying coil 241 employed in the power relaying device 240 does not require a cable or the like to be connected thereto and has an extremely simple structure with a small weight, a mechanism for holding, moving and replacing the power relaying device 240 can also be made very simple as well.

In addition, when electrically charging a passenger car CAR, the power relaying device 240 also referred to as a repeater is not required. In such a case, the power relaying device 240 can be saved in a container in the ground or the like so that power can be transferred from the wireless electrical charging apparatus 200 to the power receiving apparatus 300 mounted on the passenger car CAR by making use of the power-supplying-side resonance coil 232 and power-receiving-side resonance coil 311. In an operation to transfer power from the wireless electrical charging apparatus 200 to the power receiving apparatus 300 mounted on a vehicle having a large size, on the other hand, the power relaying device 240 is placed at the selected position between the power-supplying-side resonance coil 232 and power-receiving-side resonance coil 311 so as to electrically charge the power receiving apparatus 300 through the power relaying device 240.

Thus, the passenger car CAR can be electrically charged by making use of the power-supplying-side resonance coil 232 and power-receiving-side resonance coil 311 whereas a vehicle having a large size is electrically charged by placing the power relaying device 240 at a selected position between the power-supplying-side resonance coil 232 and power-receiving-side resonance coil 311. In this way, the wireless electrical charging system 100 can be used for electrically charging a passenger car having a small size as well as a vehicle having a large size.

In addition, in the first embodiment, the power relaying coil 241 employed in the power relaying device 240 is controlled to move to an intermediate position between the power-supplying-side resonance coil 232 employed in the power transferring device 230 and the power-receiving-side resonance coil 311 employed in the power receiving device 310. The power relaying coil 241 is placed at the intermediate position which is so selected that it is possible to obtain an optimum power transfer level or an impedance matching state.

Thus, power can be transferred from the wireless electrical charging apparatus 200 to the power receiving apparatus 300 by way of the power relaying device 240 with a high degree of efficiency and, in addition, the power transfer distance can be made longer by virtue of the power relaying device 240. As a result, it is possible to obtain a power transfer distance providing a power transferring capability which exceeds the power transferring capability of the ordinary magnetic-field resonance method.

2. Second Embodiment

Figure 20:
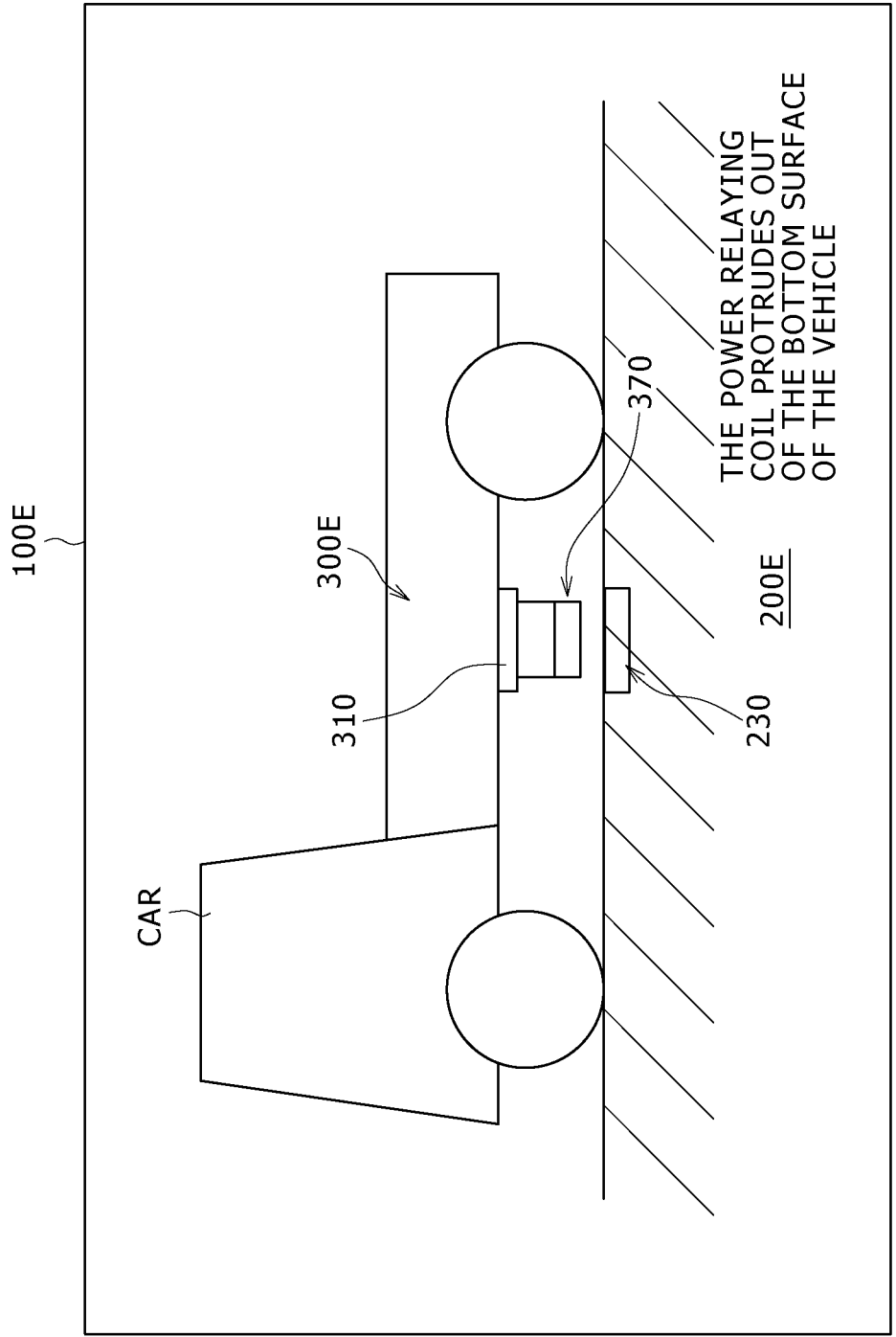
FIG. 20 is a diagram showing a second typical configuration of a wireless electrical charging system according to a second embodiment of the present invention.

FIG. 20 is a diagram showing a second typical configuration of a wireless electrical charging system 100E according to a second embodiment of the present invention.

The wireless electrical charging system 100E according to the second embodiment is different from the wireless electrical charging systems 100 to 100D according to the first embodiment in that, in the case of the wireless electrical charging system 100E according to the second embodiment, a power relaying device 370 is included in a power receiving apparatus 300E mounted on the vehicle CAR.

In order to carry out an operation to electrically charge the power receiving apparatus 300E for example, a charge switch of the power receiving apparatus 300E is typically pressed. When the charge switch is pressed, the power relaying device 370 is automatically protruded out to a position between the power-supplying-side resonance coil 232 employed in the power transferring device 230 and the power-receiving-side resonance coil 311 employed in the power receiving device 310.

In addition, in order to terminate the operation to electrically charge the power receiving apparatus 300E, another switch is pressed in order to accommodate the power relaying device 370 in a container provided at the bottom of the vehicle CAR.

3. Third Embodiment

Figure 21:
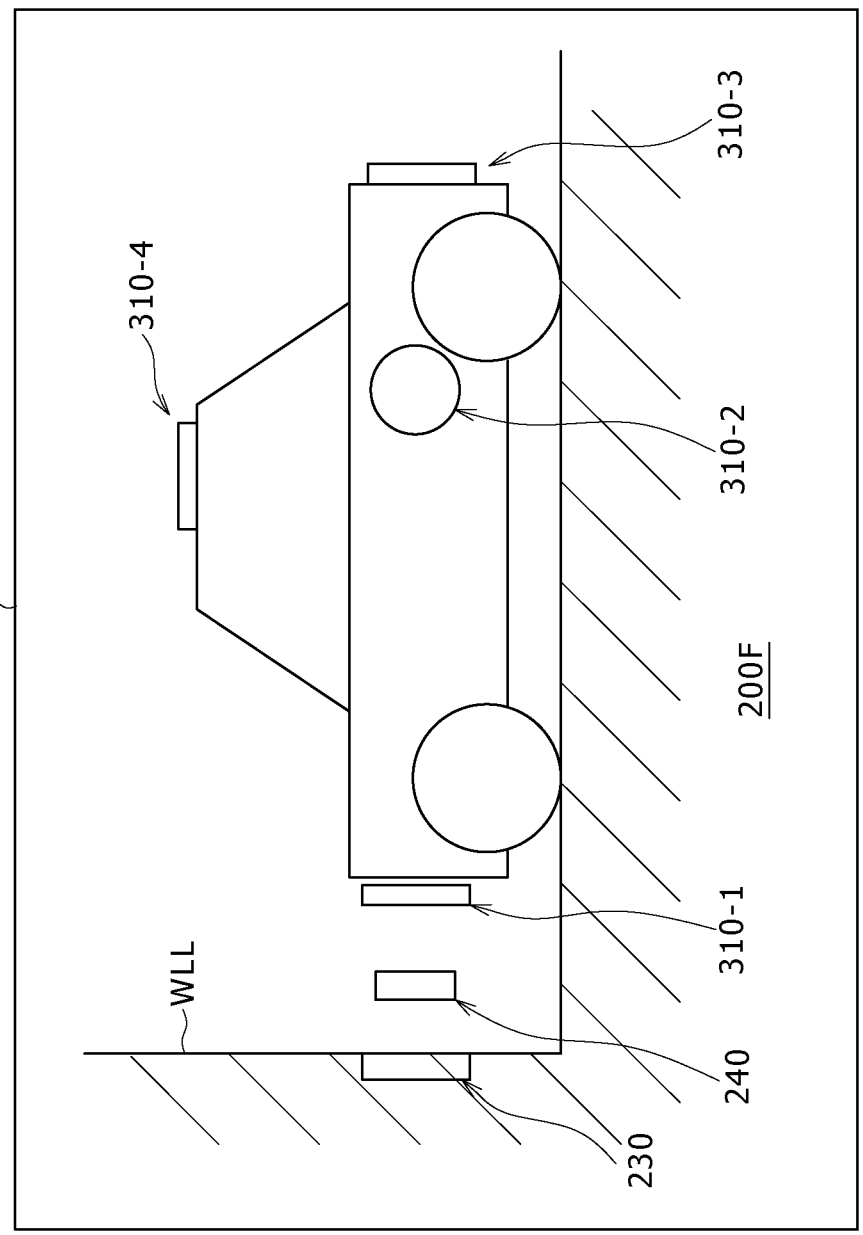
FIG. 21 is a diagram showing a third typical configuration of a wireless electrical charging system according to a third embodiment of the present invention.

FIG. 21 is a diagram showing a third typical configuration of a wireless electrical charging system 100F according to a third embodiment of the present invention.

The wireless electrical charging system 100F according to the third embodiment is different from the wireless electrical charging systems 100 to 100D according to the first embodiment and the wireless electrical charging system 100E according to the second embodiment in that, in the case of the wireless electrical charging system 100F according to the third embodiment, a plurality of power receiving devices 310 are mounted on the vehicle CAR. In the case of the typical configuration of the wireless electrical charging system 100F according to the third embodiment, power receiving devices 310-1 to 310-4 are mounted on the vehicle CAR.

In this typical configuration, instead of installing the power receiving devices 310 at the bottom of the vehicle CAR, the power receiving device 310-1 is mounted at on a bonnet on the front surface of the vehicle CAR whereas the power receiving device 310-2 is mounted on the surface of a side portion of the vehicle CAR. On the other hand, the power receiving device 310-3 is mounted on the rear end of the trunk of the vehicle CAR on the rear surface of the vehicle CAR whereas the power receiving device 310-4 is mounted on the upper surface of the ceiling of the vehicle CAR.

In a wireless electrical charging apparatus (stand) 200F, the power transferring device 230 is installed on a wall surface WLL.

In addition, the power relaying device 240 is provided if necessary.

4. Fourth Embodiment

Figure 22:
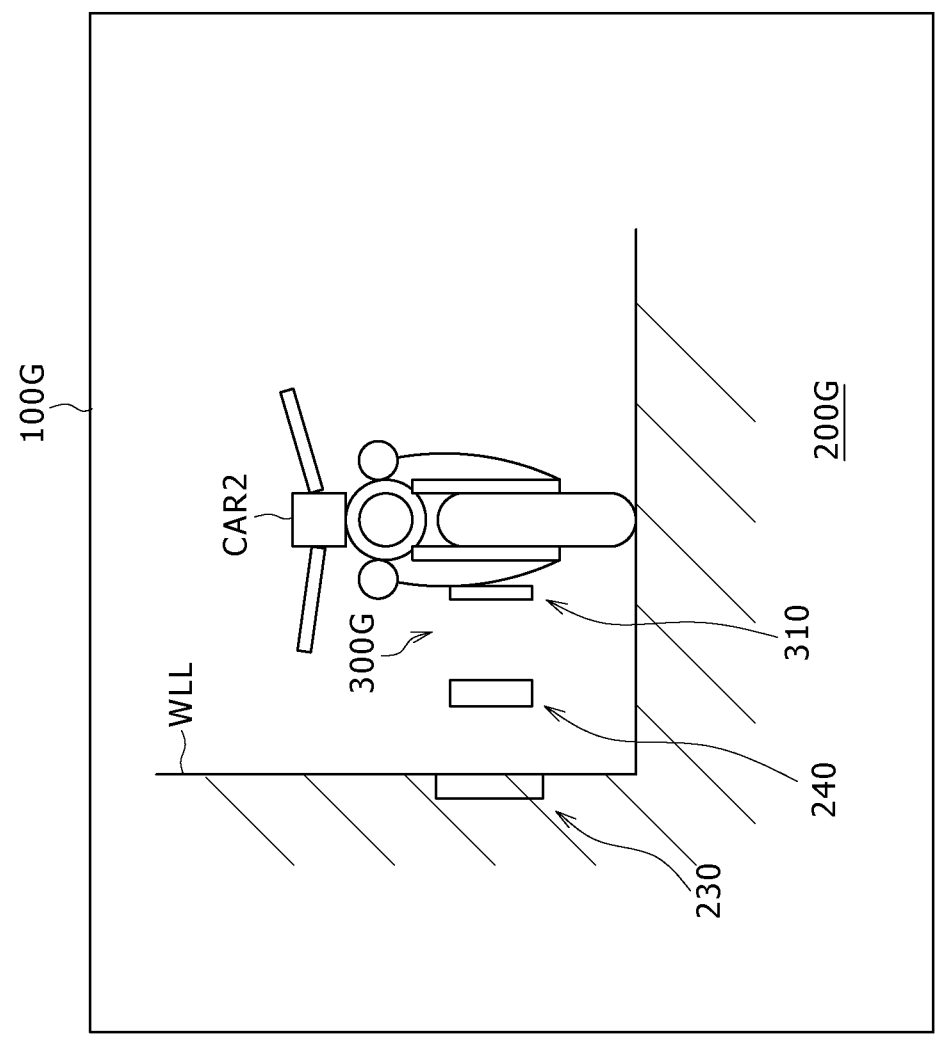
FIG. 22 is a diagram showing a fourth typical configuration of a wireless electrical charging system according to a fourth embodiment of the present invention.

FIG. 22 is a diagram showing a third typical configuration of a wireless electrical charging system 100G according to a fourth embodiment of the present invention.

The wireless electrical charging system 100G according to the fourth embodiment is a wireless electrical charging system provided by the present invention to function as a system not designed for four-wheel vehicles, but designed for a two-wheel electric bicycle, an electric scooter and an electric car (an electric assist car) CAR2.

In a wireless electrical charging apparatus (stand) 200G, the power transferring device 230 is installed on a wall surface WLL.

In addition, the power relaying device 240 is provided if necessary.

The present application contains subject matter related to that disclosed in Japanese Priority Patent Application JP 2010-017994 filed with the Japan Patent Office on Jan. 29, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless electrical charging apparatus, comprising:
 a power-supply unit configured to generate power to be transferred to a power receiving apparatus;
 a power transferring device configured to transfer the power generated by the power-supply unit to the power receiving apparatus;
 a power relaying device configured to relay the power transferred by the power transferring device to the power receiving apparatus;
 a power-relaying-device moving mechanism section configured to move the power relaying device;

an impedance matching detector configured to detect an impedance matching state from a transferred-power signal generated in the wireless electrical charging apparatus; and a power-transfer control section configured to control the power-relaying-device moving mechanism section to adjust a position of the power relaying device so as to expose the power relaying device to the power transferring device in order to provide the impedance matching state in accordance with a result of detection carried out by the impedance matching detector, wherein, the power transferring device includes a first resonance element configured to transfer power received from the power-supply unit to the power receiving apparatus, the power relaying device includes a second resonance element configured to receive power supplied by the first resonance element via a magnetic-field resonance and transfer the power to the power receiving apparatus via the magnetic-field resonance, the power-relaying-device moving mechanism section is configured to move the power relaying device between (i) a first state in which the power relaying device does not relay the power transferred by the power transferring device to the power receiving apparatus and (ii) a second state in which the power relaying device relays the power transferred by the power transferring device to the power receiving apparatus, and the power-relaying-device moving mechanism section is configured to at least adjust the position of the power relaying device so as to expose the power relaying device to the power transferring device.

2. The wireless electrical charging apparatus according to claim 1, further comprising a power-relaying-device accommodation section configured to accommodate the power relaying device when the power relaying device is not being used, wherein:

(i) when the power relaying device is not being used to relay the power transferred by the power transferring device to the power receiving apparatus, the power-relaying-device moving mechanism section keeps the power relaying device in the power-relaying-device accommodation section so that the power relaying device does not receive magnetic fluxes generated by the power transferring device, and (ii) when the power relaying device is being used to relay the power transferred by the power transferring device to the power receiving apparatus, the power-relaying-device moving mechanism section moves the power relaying device out of the power-relaying-device accommodation section so that the power relaying device receives the magnetic fluxes generated by the power transferring device.

3. The wireless electrical charging apparatus according to claim 1, wherein:

the power-transfer control section is configured (i) to receive information on a level of the power transferred by the power transferring device to the power relaying device and (ii) to control the power-relaying-device moving mechanism section to adjust the position of the power relaying device so as to expose the power relaying device to the power transferring device in order to raise the level indicated by the received information.

4. The wireless electrical charging apparatus according to claim 1, wherein:

prior to an actual transfer of power from the power transferring device to the power receiving apparatus, the power-transfer control section is configured to control the power transferring device to transfer less power than the power to be transferred in the actual transfer of power, and, with the power transferring device controlled to enter a state of transferring power less than the power to be transferred in the actual transfer of power, the power-transfer control section controls the power-relaying-device moving mechanism section to adjust the position of the power relaying device so as to expose the power relaying device to the power transferring device in order to provide the impedance matching state in accordance with the result of detection carried out by the impedance matching detector, and the power-transfer control section controls the power transferring device to transfer regular the power in the actual transfer of power after controlling the power-relaying-device moving mechanism section to adjust the position of the power relaying device so as to expose the power relaying device to the power transferring device.

5. A wireless electrical charging system, comprising:

(1) a wireless electrical charging apparatus including (a) power-supply unit configured to generate power to be used for electrically charging a battery included in a power receiving apparatus, (b) a power transferring device configured to transfer the power generated by the power-supply unit to the power receiving apparatus, (c) a power relaying device configured to relay the power transferred by the power transferring device to the power receiving apparatus, (d) a power-relaying-device moving mechanism section configured to move said power relaying device, the power-relaying-device moving mechanism section being configured to move the power relaying device between (i) a first state in which the bower relaying device does not relay the power transferred by the power transferring device to the power receiving apparatus and (ii) a second state in which the power relaying device relays the power transferred by the power transferring device to the power receiving apparatus, and (e) a power-relaying-device accommodation section configured to accommodate the power relaying device when the power relaying device is not being used; and (2) the power receiving apparatus including a power receiving device configured to receive the power transferred by the power transferring device of the wireless electrical charging apparatus via a magnetic-field resonance either directly from the power transferring device or from the power relaying device, and to electrically charge the battery, wherein, (a) the power transferring device includes a first resonance element configured to receive power supplied by the power-supply unit and to transfer said power to the power receiving device, (b) the power relaying device includes a second resonance element configured to receive power supplied by the first resonance element via through the magnetic-field resonance and relay the received power to the power receiving device via the magnetic-field resonance, (c) the power receiving device includes a third resonance element configured to receive the power transferred by the transferring device to the power receiving device via the magnetic-field resonance relation either directly from the first resonance element in the power transferring device or from the second resonance element in the power relaying device (d) the power receiving apparatus further includes
  (i) a power-receiving-side radio communication section configured to transmit a radio signal to the wireless electrical charging apparatus,
  (ii) a level detection section configured to detect a level of power received by the power receiving apparatus, and
  (iii) a power-receiving-side power-transfer control section configured to control the power-receiving-side radio communication section to transmit a radio signal conveying information on a level detected by the level detection section as the level of power received by the power receiving apparatus to the wireless electrical charging apparatus, (e) the wireless electrical charging apparatus further includes
  (i) a power-supplying-side radio communication section configured to receive the radio signal conveying the information on the level of power received by the power receiving apparatus from the power receiving apparatus, and
  (ii) a power-supplying-side power-transfer control section configured to receive the information on the level of power from the power receiving apparatus through the power-supplying-side radio communication section and control the power-relaying-device moving mechanism section to adjust a position of the power relaying device so as to expose the power wer transferring device in order to raise the level indicated by the received information, (f) the power-relaying-device moving mechanism section is configured to at least adjust the position of the power relaying device so as to expose the power relaying device to the power transferring device, (g) when the power relaying device is not being used to relay the power transferred by the power transferring device to the power receiving apparatus, the power-relaying-device moving mechanism section keeps the power relaying device in the power-relaying-device accommodation section so that the power relaying device does not receive magnetic fluxes generated by the power transferring device, and (h) when the power relaying device is being used to relay the power transferred by the power transferring device to the power receiving apparatus, the power-relaying-device moving mechanism section moves the power relaying device out of the power-relaying-device accommodation section so that the power relaying device receives the magnetic fluxes generated by the power transferring device.

6. The wireless electrical charging system according to claim 5, wherein:
  prior to an actual transfer of power from the power transferring device to the power receiving apparatus, the power-supplying-side power-transfer control section is configured to control the power transferring device to transfer less power than the power to be transferred in the actual transfer of power, and, with the power transferring device controlled to enter a state of transferring power less than the power to be transferred in the actual transfer of power, the power-transfer control section controls the power-relaying-device moving mechanism section to adjust the position of the power relaying device so as to expose the power relaying device to the power transferring device in order to raise the level of power transferred by the power transferring device, and
  the power-supplying-side power-transfer control section controls the power transferring device to transfer the power in the actual transfer of power after controlling the power-relaying-device moving mechanism section to adjust the position of the power relaying device so as to expose the power relaying device to the power transferring device.

7. The wireless electrical charging system according to claim 5, wherein the wireless electrical charging apparatus further includes:
  an impedance matching detector configured to detect an impedance matching state from a transferred-power signal generated in the wireless electrical charging apparatus, and
  a power-transfer control section configured to control the power-relaying-device moving mechanism section to adjust the position of the power relaying device so as to expose the power relaying device to the power transferring device in order to provide the impedance matching state in accordance with a result of detection carried out by the impedance matching detector.

8. The wireless electrical charging system according to claim 7, wherein:
  prior to an actual transfer of power from the power transferring device to the power receiving apparatus, the power-transfer control section is configured to control the power transferring device to transfer less power than the power to be transferred in the actual transfer of power, and, with the power transferring device controlled to enter a state of transferring less power than the power to be transferred in the actual transfer of power, the power-transfer control section controls the power-relaying-device moving mechanism section to adjust the position of the power relaying device so as to expose the power relaying device to the power transferring device in order to provide the impedance matching state in accordance with the result of detection carried out by the impedance matching detector, and
  the power-transfer control section controls the power transferring device to transfer the power in the actual transfer of power after controlling the power-relaying-device moving mechanism section to adjust the position of the power relaying device so as to expose the power relaying device to the power transferring device.

* * * * *